(12) United States Patent
Frolikov

(10) Patent No.: US 11,093,140 B2
(45) Date of Patent: Aug. 17, 2021

(54) PERFORMANCE ALLOCATION AMONG USERS FOR ACCESSING NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 236 days.

(21) Appl. No.: 15/875,944

(22) Filed: Jan. 19, 2018

(65) Prior Publication Data

US 2019/0227718 A1    Jul. 25, 2019

(51) Int. Cl.
*G06F 12/00* (2006.01)
*G06F 3/06* (2006.01)
*G06F 12/06* (2006.01)

(52) U.S. Cl.
CPC ............ *G06F 3/0613* (2013.01); *G06F 3/064* (2013.01); *G06F 3/0605* (2013.01); *G06F 3/068* (2013.01); *G06F 3/0631* (2013.01); *G06F 3/0644* (2013.01); *G06F 3/0656* (2013.01); *G06F 3/0659* (2013.01); *G06F 12/0646* (2013.01); *G06F 2212/1016* (2013.01); *G06F 2212/1041* (2013.01)

(58) Field of Classification Search
CPC ..... G06F 3/061; G06F 12/0646; G06F 3/0613
See application file for complete search history.

(56) References Cited

U.S. PATENT DOCUMENTS

| | | | |
|---|---|---|---|
| 2008/0222311 A1* | 9/2008 | Lee | G06F 3/061 710/6 |
| 2012/0066685 A1 | 3/2012 | Staelin et al. | |
| 2015/0026402 A1* | 1/2015 | Iida | G06F 3/061 711/117 |
| 2016/0085696 A1 | 3/2016 | Chiu et al. | |
| 2016/0117119 A1* | 4/2016 | Kim | G06F 13/1642 711/103 |
| 2017/0277470 A1* | 9/2017 | Kiyota | G06F 3/0644 |
| 2017/0322897 A1 | 11/2017 | Benisty et al. | |
| 2019/0370050 A1* | 12/2019 | Kumar | G06F 12/1063 |

OTHER PUBLICATIONS

International Search Report and Written Opinion, PCT/US2019/012067, dated May 1, 2019.

* cited by examiner

*Primary Examiner* — Baboucarr Faal
(74) *Attorney, Agent, or Firm* — Greenberg Traurig

(57) ABSTRACT

A computer having a plurality of accounts and a storage device having a host interface, a controller, non-volatile storage media, and firmware. An account is configured with at least a predetermined speed in accessing the non-volatile storage media by allocating a number of input/output submission queues in the buffer area of the host. The number can be determined from a ratio between the predetermined speed configured for the account and a saturated speed of the storage device with sufficient submission queues. Data access requests from the account are evenly distributed to the submission queues allocated for the exclusive use by the account; and the controller, configured via the firmware, processes with equal priority the submission queues configured for the storage device. Thus, the account can have at least the predetermined speed in accessing the non-volatile storage media, regardless of how other accounts access the storage device.

16 Claims, 23 Drawing Sheets

PERFORMANCE ALLOCATION AMONG USERS FOR ACCESSING NON-VOLATILE MEMORY DEVICES

FIELD OF THE TECHNOLOGY

At least some embodiments disclosed herein relate to computer storage devices in general and more particularly, but not limited to performance in accessing non-volatile storage memories.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
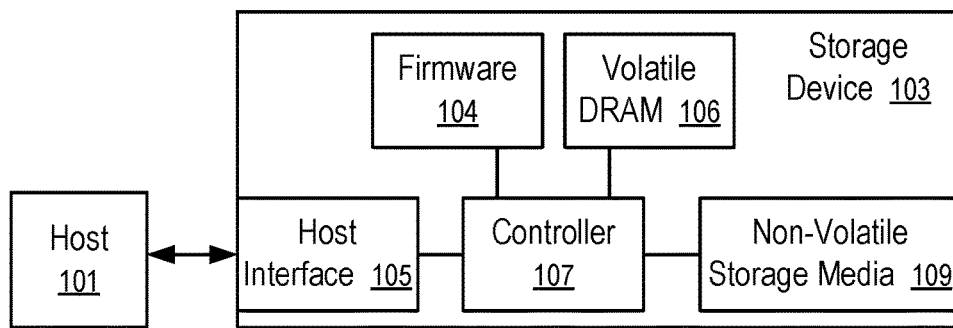
FIG. 1 shows a computer system in which embodiments of inventions disclosed herein can be implemented.

In at least one embodiment disclosed herein, the storage resource allocated from a storage device for an account on a computing device is managed as a named set of logical addresses that has a range from zero to a maximum logical address corresponding to a quota for the account. The size of the named set can be dynamically adjusted via a map between the logical addresses defined in the named set and the logical addresses defined in the entire capacity of the storage device. Performance in accessing the storage resource allocated to the account, among other accounts in the computing device, for storing data in the account or retrieving data in the account can be budgeted and/or throttled through the allocation and/or adjustment of the number of input/output queues assigned to the account. Within a limit the data access performance of the account can be provisioned in a way substantially proportional to the number of input/output queues assigned/allocated to the account.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments of the inventions disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

FIG. 1 shows a computer system in which embodiments of inventions disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
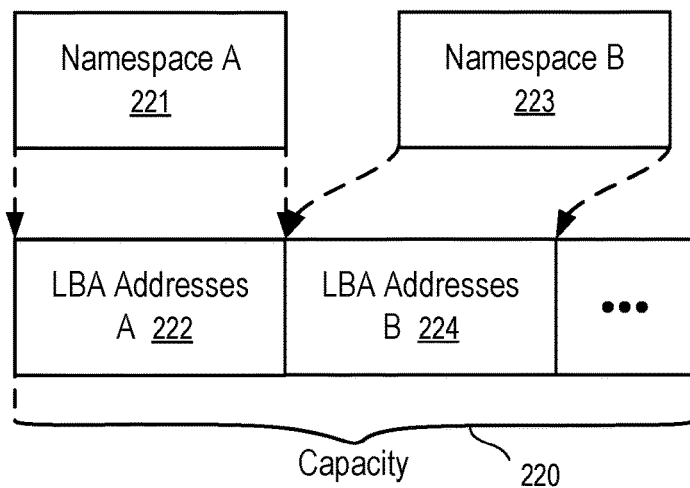
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
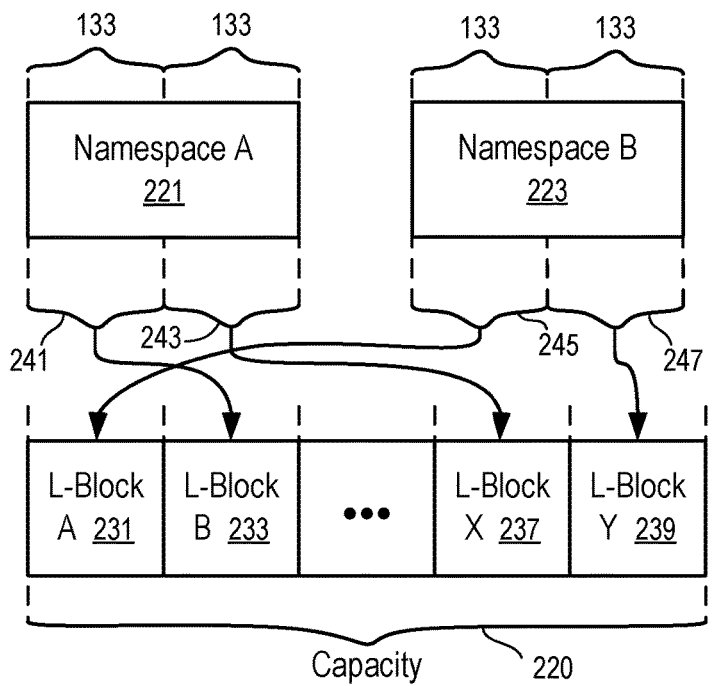
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, . . . , 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, . . . , 237, 239) illustrated in FIG. 3, the allocation of a namespace (e.g., 221 or 223) does not have to be from a contiguous region of the capacity (220). A set of L-blocks (231, 233, . . . , 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
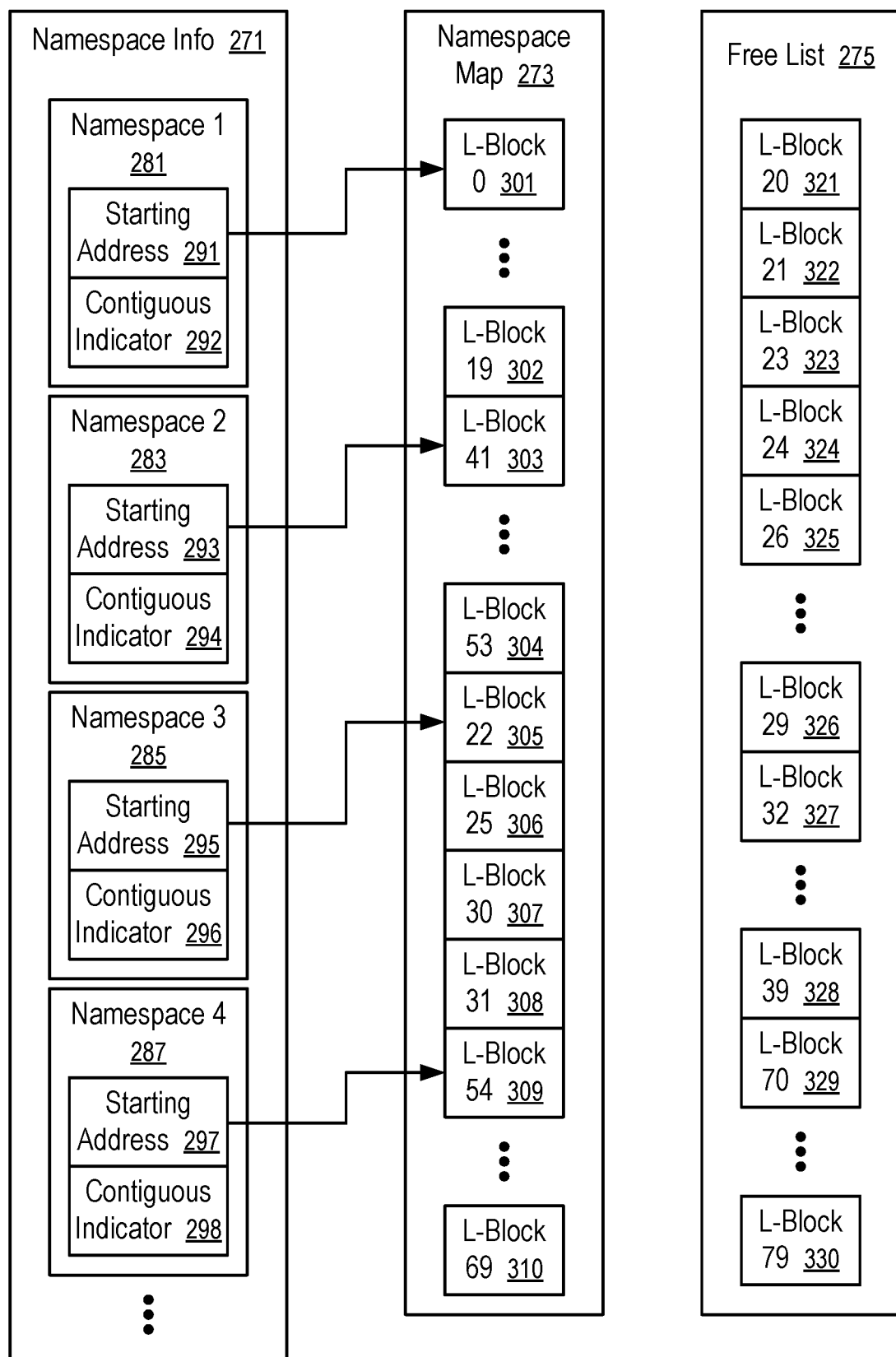
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, . . . , 237, 239) that have been allocated to a set of namespaces (e.g., 221, 223) identified in namespace info (271).

In the array of the namespace map (273), the identifications of L-blocks (301, . . . , 302; 303, . . . , 304; 305, . . . 308; or 309, . . . , 310) allocated for each namespace (281, 283, 285, or 287) are stored in a contiguous region of the array. Thus, the portions of identifications of L-blocks (301, . . . , 302; 303, . . . , 304; 305, . . . 308; and 309, . . . , 310) allocated for different namespaces (281, 283, 285, and 287) can be told apart from the identification of the starting addresses (291, 293, 295, and 297) of the block identifications in the array.

Optionally, for each of the each namespaces (281, 283, 285, or 287), the namespace info (271) identifies whether or not the L-blocks (301, . . . , 302; 303, . . . , 304; 305, . . . 308; or 309, . . . , 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220).

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, . . . , 326-327, . . . , 328-329, . . . , 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
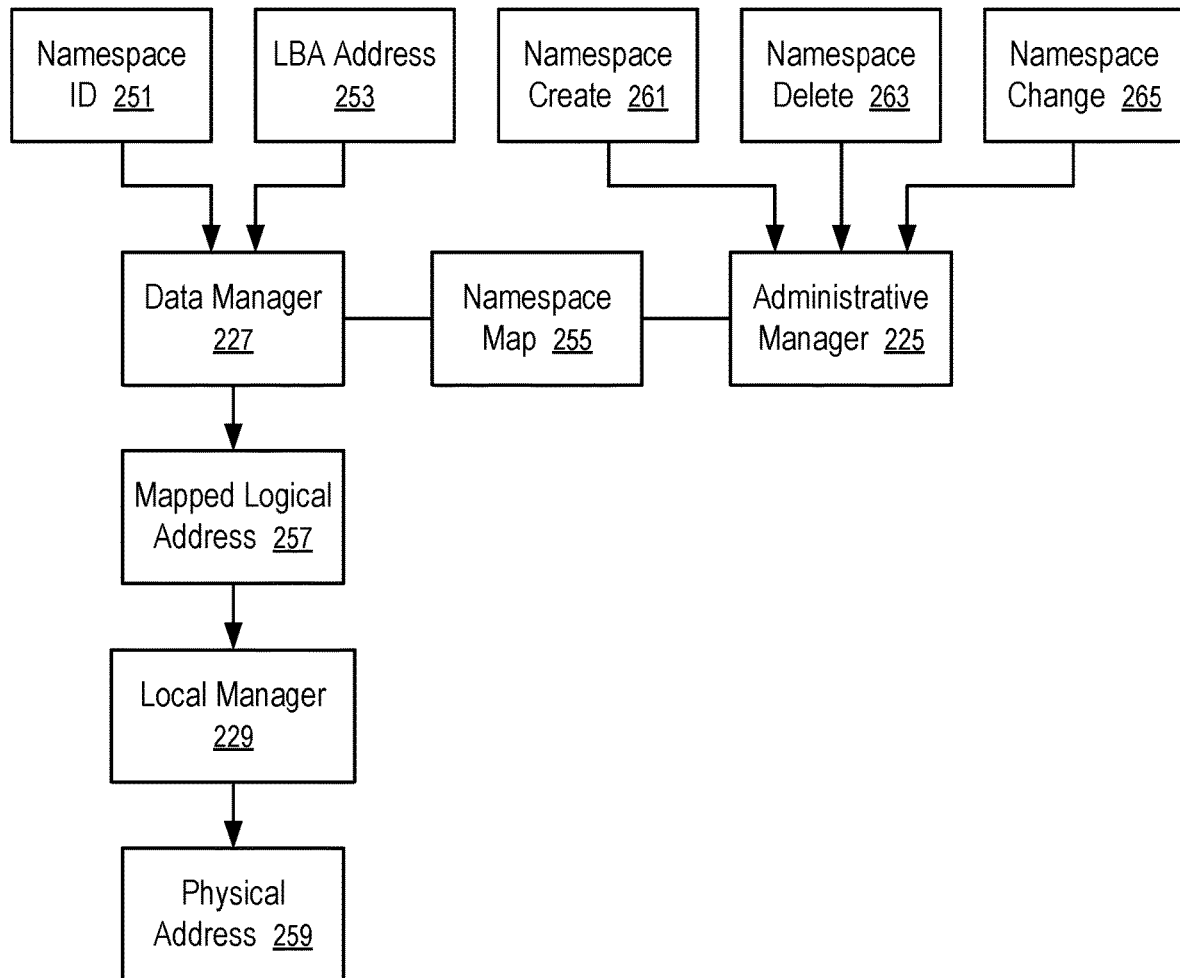
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
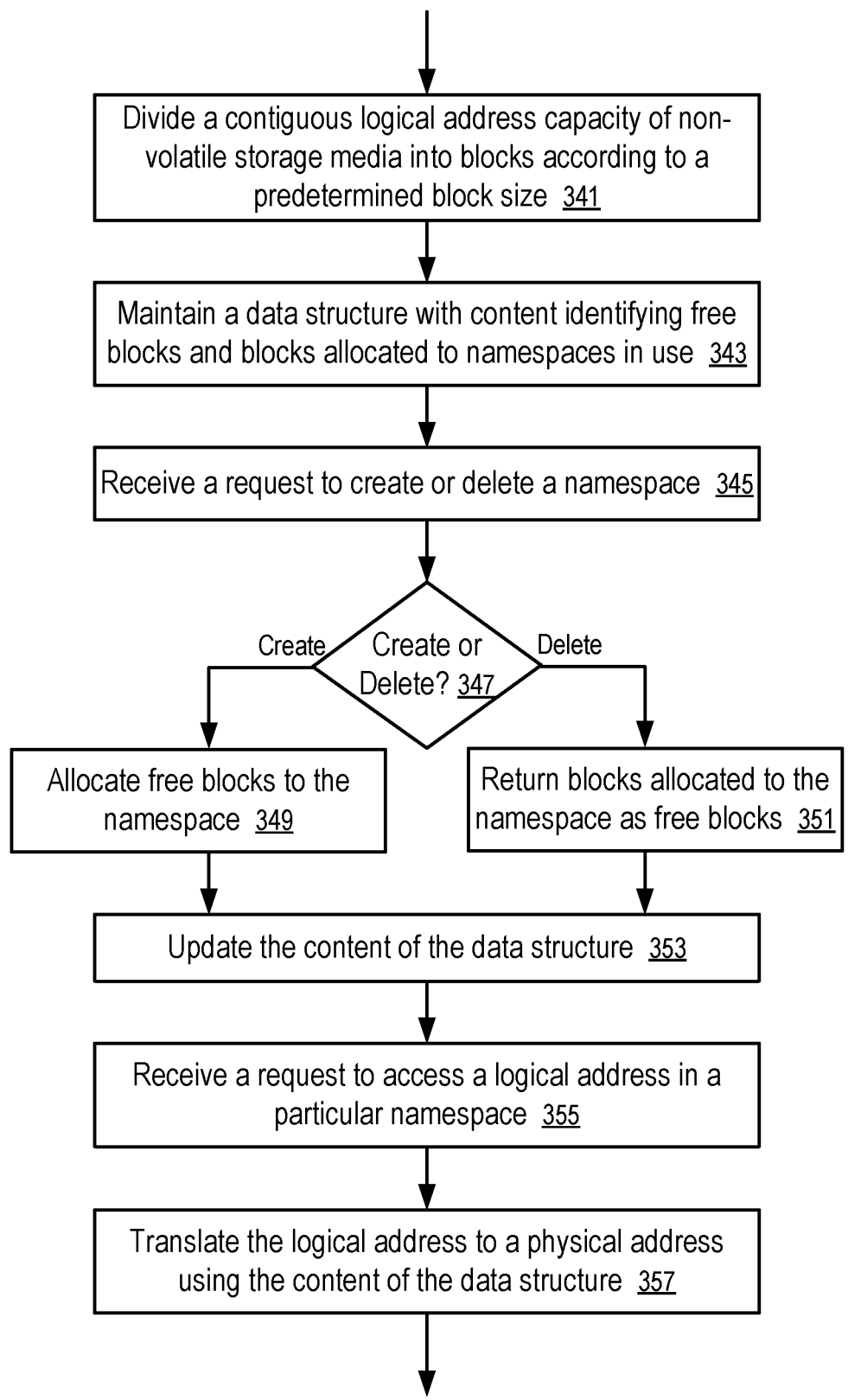
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, . . . , 237, 239) according to a predetermined block size (133) and maintaining (343) a data structure (e.g., illustrated in FIG. 4) with content identifying free blocks (e.g., 312-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 312-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, . . . , 237, 239) according to the block size (133); and maintain a data structure to identify: a free subset of the L-blocks that are available for allocation to new namespaces (e.g., L-blocks 312-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

Figure 7:
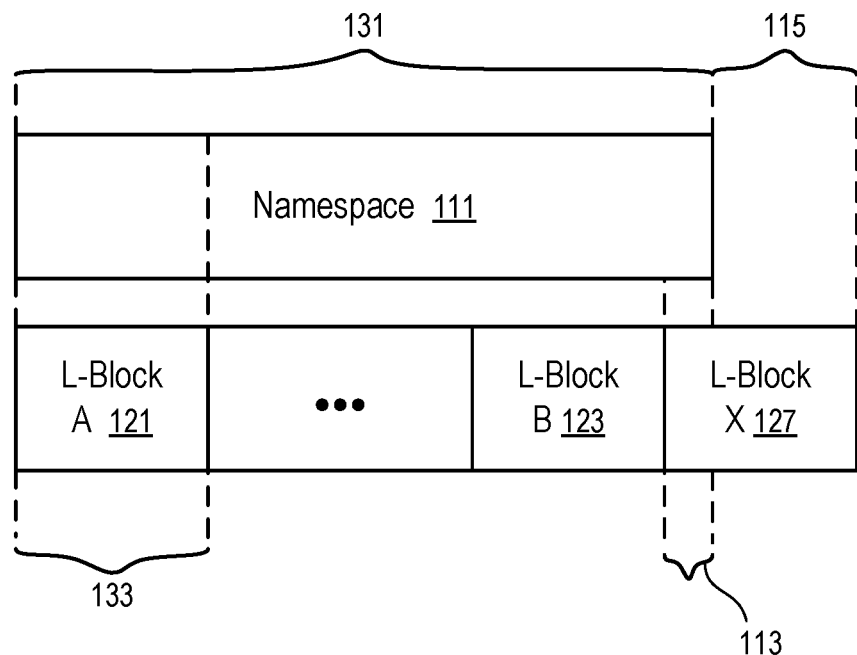
FIG. 7 shows an example diagram where a namespace is not aligned with block boundaries and can be implemented using the techniques of FIGS. 8-10.

FIG. 7 shows an example diagram where a namespace is not aligned with block boundaries and can be implemented using the techniques of FIGS. 8-11.

When a host (e.g., 101 in FIG. 1) requests the creation or reservation of a namespace (111) having a requested namespace size (131), a controller (e.g., 107 in FIG. 1) allocates a section of its non-volatile storage media (e.g., 109 in FIG. 1) to be addressed via LBA addresses under the namespace (111).

In a scenario illustrated in FIG. 7, the requested namespace size (131) is not the multiple of the block size (133). As a result, if the first LBA address in the namespace (111) representing a memory unit located in the namespace (111) is aligned with (e.g., mapped to) the first LBA address of an L-block (e.g., 121), the last LBA address in the namespace (111) cannot be aligned with (e.g., mapped to) the last LBA address of an L-block (e.g., 123), as illustrated in FIG. 7. Therefore, the namespace (111) is not aligned with boundaries of L-blocks for allocation. Since the requested namespace size (131) is not the multiple of the block size (133), the requested namespace size (131) is best satisfied by a number of full blocks (121, . . . , 123) and a portion (113) of a full block (127). The portion (113) is also referred to as a partial block (113).

In FIG. 7, the portion (113) of the full block (127) (or partial block (113)) is allocated for the namespace (111); and the remaining portion (115) of the full block (127) (or partial block (115)) is not allocated for the namespace (111). The remaining portion (115), or a portion of it, can be subsequently allocated to another namespace that also needs a partial block. Different namespaces may use different portions (e.g., 113, 115) of the full block (127).

Figure 8:
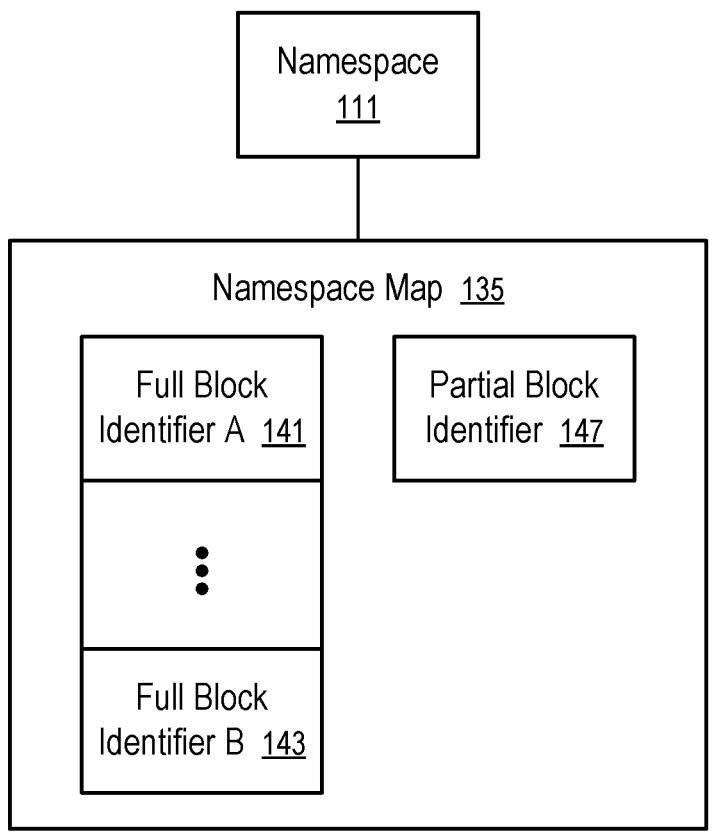
FIG. 8 illustrates an example block diagram of a namespace map to implement a namespace that is not aligned with block boundaries.

FIG. 8 illustrates an example block diagram of a namespace map to implement a namespace that is not aligned with block boundaries.

In FIG. 8, a namespace map (135) is linked to the namespace (111) to identify the blocks of LBA addresses allocated for the namespace (111). Any techniques for identification of the association of two items can be used to link the namespace map (135) to the namespace (111). For example, an identifier of the namespace map (135) can be stored in association with an identifier of the namespace (111) to link the namespace map (135) and the namespace (111). For example, a list of pointers corresponding to a list allocated namespaces can be used to identify the beginning memory locations of data structures of namespace maps to link the namespace maps with their namespaces. The addresses in the L-blocks (e.g., (121, . . . , 123)) can be further translated to the corresponding addresses of the physical storage locations by a separate layer of the firmware (104) (e.g., Flash Translation Layer (FTL) for solid state drives (SSDs)).

The namespace map (135) includes the identifiers (141, . . . , 143) of the full blocks (121, . . . , 123) allocated for the namespace (111) and an identifier (147) of a partial block (113) allocated for the namespace (111).

Since the full blocks (121, . . . , 123) have the same, predetermined block size (133), the list of full block identifiers (141, . . . , 143) can be identified using an array or list of the identifiers of starting units (or ending units) of the full blocks (121, . . . , 123). This arrangement simplifies the namespace map (135) and enables efficient address translation. However, the partial block (113) cannot be represented in such a way.

Figure 9:
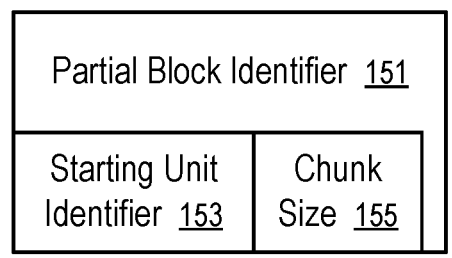
FIG. 9 illustrates an example partial block identifier that can be used to implement the namespace map of FIG. 8.

FIG. 9 illustrates an example partial block identifier that can be used to implement the namespace map of FIG. 8.

In FIG. 9, a partial block identifier (151) includes a starting unit identifier (153) and a chunk size (155). The starting unit identifier (153) is an identifier of the first logical memory unit in the partial block (e.g., 113 or 115) represented by the partial block identifier (151). When the partial block (113) is allocated on a chunk of memory units, the chunk size (155) represents the quantity of the memory units allocated to the partial block (113). Thus, the chunk size (155) can be added to the starting unit identifier (153) to compute the ending unit identifier, which is the last unit in the partial block (e.g., 113 or 115) represented by the partial block identifier (151). In combination, the partial block identifier (151) identifies a unique portion (e.g., 113 or 115) of a full block (e.g., 127). When the chunk size (155) is equal to the block size (133), the partial block identifier (151) actually represents a full block. So, a partial block identifier (151) can be used to represent a full block (which can be subsequently divided into multiple partial blocks (e.g., 113 or 115); and multiple contiguous partial blocks (e.g., 113 or 115) can be combined into a full block (e.g., 127).

For example, the partial block identifier (151), having the corresponding data specifying the starting unit identifier (153) and the chunk size (155) for the partial block (113), can be used as the partial block identifier (147) in the namespace map (135) of FIG. 8 to represent the partial block (113) in FIG. 7 allocated for the namespace (111).

For example, the partial block identifier (151), having the corresponding data specifying the starting unit identifier (153) and the chunk size (155) for the partial block (115), can be used to represent the unallocated partial block (115) in FIG. 7 that is free and available for allocation to another namespace. A linked list of unallocated partial blocks (e.g., 115) can be used to track a pool of free partial blocks.

Alternatively, the chunk size (155) in the partial block identifier (151) can be replaced with the ending unit identifier of the corresponding partial block. The partial block identifier (151) can also be equivalently represented by a combination of the chunk size (155) and the ending unit identifier.

Figure 10:
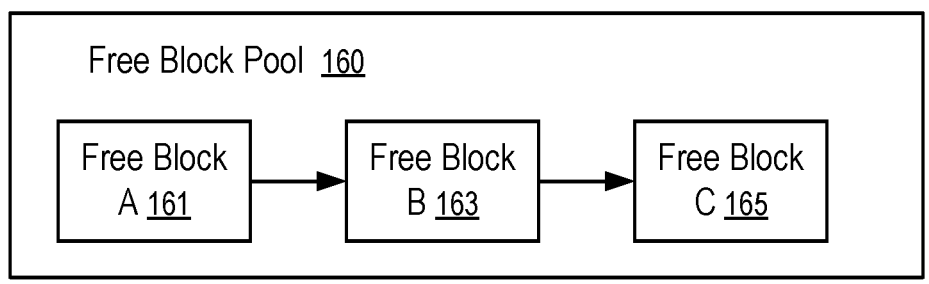
FIG. 10 illustrates an example data structure to manage a pool of free blocks available for namespace allocation using the technique of FIG. 8.

The controller (107), programmed by the firmware (104), stores data (e.g., in volatile DRAM (106) and/or non-volatile storage media (109)) to track a pool of free blocks using a linked list of partial blocks as illustrated in FIG. 10.

Preferably, each namespace map (135) uses no more than one partial block (113) for efficient address translation. However, in some instances, a namespace map (e.g., 135) may include multiple partial blocks (e.g., 113) when there is not a single free partial block (e.g., 113) to satisfy the request.

FIG. 10 illustrates an example data structure to manage a pool of free blocks available for namespace allocation using the technique of FIG. 8.

A data structure of a free block pool (160) includes identifiers of free blocks (161, 163, . . . , 165).

In one implementation, the free block pool (160) is used to track the available free partial blocks (e.g., 115) that can be allocated to new namespaces. Each of the free blocks (161, 163, . . . , 165) can be identified using the partial block identifier (151) illustrated in and/or discussed in connection with FIG. 9.

In some implementations, the free block pool (160) also optionally tracks the available free full blocks (161, 163, . . . , 165), where each of the full blocks are conveniently represented using the data structure of the partial block identifier (151) illustrated in FIG. 9, with the chunk size (155) being equal to the block size (133).

In other implementations, the free block pool (160) tracks the available free full blocks (161, 163, . . . , 165), using a list of full block identifiers in a way similar to the list of full block identifiers used in the namespace map (135), where each of the full block identifiers is presented by a representative unit identifier (e.g., a starting unit, or an ending unit), in view of the known, uniform block size (133) of the full blocks.

Figure 11:
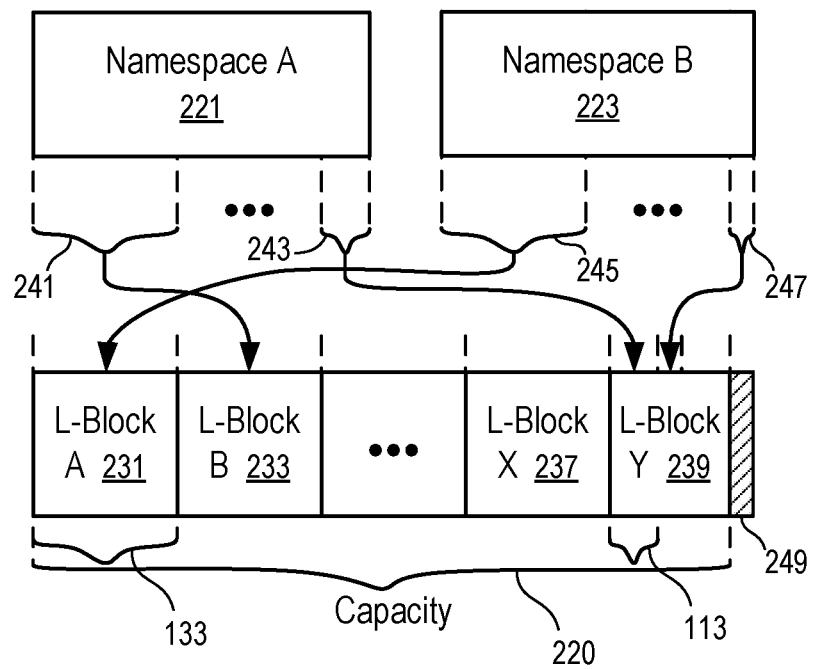
FIG. 11 illustrates an example of allocating namespaces using partial blocks.

The administrative manager (225) may use the partial block identification techniques discussed above in connection with FIGS. 7-10 to efficiently handle the mismatch of the requested namespace size (131) and/or the capacity (220) with the block size (133), with increased flexibility and minimum impact on address translation performance, as illustrated in FIG. 11.

FIG. 11 illustrates an example of allocating namespaces using partial blocks.

For example, the technique of FIG. 11 can be used to facilitate dynamic namespace management on the storage device (103) illustrated in FIG. 1 using the partial block identification techniques of FIGS. 8-10.

In FIG. 11, the storage capacity (220) of the non-volatile storage media (109) is divided into blocks of LBA addresses (L-blocks) (231, 233, . . . , 237) of the same size (e.g., 133 illustrated in FIG. 7), except that the last block (239) has a size smaller than the predetermined block size (133). In FIG. 11, the administrative manager (225) may virtually expand the last block (239) to include a virtual capacity (249) such that the last block (239) may also be viewed to have the same size (133). However, since the virtual capacity (249) is not available for allocation to any namespace, the administrative manager (225) puts the free portion of the last block (239) in a free block pool (160) as an available partial block (e.g., represented by a partial block identifier (151) of FIG. 9, as if the portion of the virtual capacity (249) had already been allocated to an existing namespace.

Preferably, the block size (133) is a power of two, which is advantageous in optimizing the computations involving the block size (133). For example, when the block size (133) is a power of two, operations of division, modulo, and/or multiplication involving the block size (133) can be simplified via shift operations.

The logical addresses in the L-blocks (231, 233, . . . , 237, 239) can be translated into physical addresses of the non-volatile storage media (109) independent from the allocation of namespaces (e.g., 221, 223) (e.g., by a flash translation layer of the firmware (104) of the storage device (103) configured as a solid state drive (SSD)).

Dividing the storage capacity (220) into the (L-blocks) (231, 233, . . . , 237), with a possible partial block (239), allows the dynamic management of namespaces at the block level. The logical addresses defined in the namespaces (e.g., 221, 223) are mapped to the L-blocks (231, 233, 237, 239) defined on the capacity (220) such that the namespace implementation details are shielded from the translation from the mapped logical address (257) in the L-blocks (231, 233, 237, 239) to the physical addresses (259) of the non-volatile storage media (109).

For example, a full size block (241) of logical addresses in namespace A (221) is linearly mapped into the mapped logical addresses (257) in one L-block (233). Similarly, a full size block (245) of logical addresses in namespace B (221) is linearly mapped into the mapped logical addresses (257) in another L-block (231). The block-wise mapping of logical addresses improves efficiency in the address translation.

When the sizes of the namespaces (221, 223) are not multiples of the block size (133), portions (243, 247) of the namespaces (221, 223) can be mapped to partial blocks of one or more full size blocks (e.g., 237) in a way as illustrated in FIGS. 7-11. The data structure of FIG. 4 can be modified to include a partial block identifier (147) of a partial L-block (113) allocated to a namespace (221) that has a last portion (e.g., 243) that is smaller than the predetermined block size (e.g., 133), and to include a list of free partial blocks.

By maintaining a namespace map (e.g., 135 illustrated in FIG. 8, 273 illustrated in FIG. 4, which may be further modified to include partial block identifiers) and a free block pool (e.g., 160 illustrated in FIG. 10, 275 illustrated in FIG. 4, which may be further modified to include partial block identifiers), the controller (107) of the storage device (103) allows dynamic management of namespaces, where namespaces may be created/allocated when needed, deleted when no longer used, and/or resized, with fragmentation impact being reduced or eliminated. The mapping from the logical addresses in the namespace (e.g., 221, 223) to the logical addresses for translation to physical addresses can be dynamically adjusted in response to the commands from the host (101) to create/allocate, delete, and/or resize namespaces (e.g., shrink or expand).

Optionally, when the host (101) requests a namespace (e.g., 111, 221, or 223) that has a size not aligned with a block boundary, the host (101) may be prompted to revise the size of the namespace (e.g., 111, 221, or 223) for alignment with a block boundary.

Figure 12:
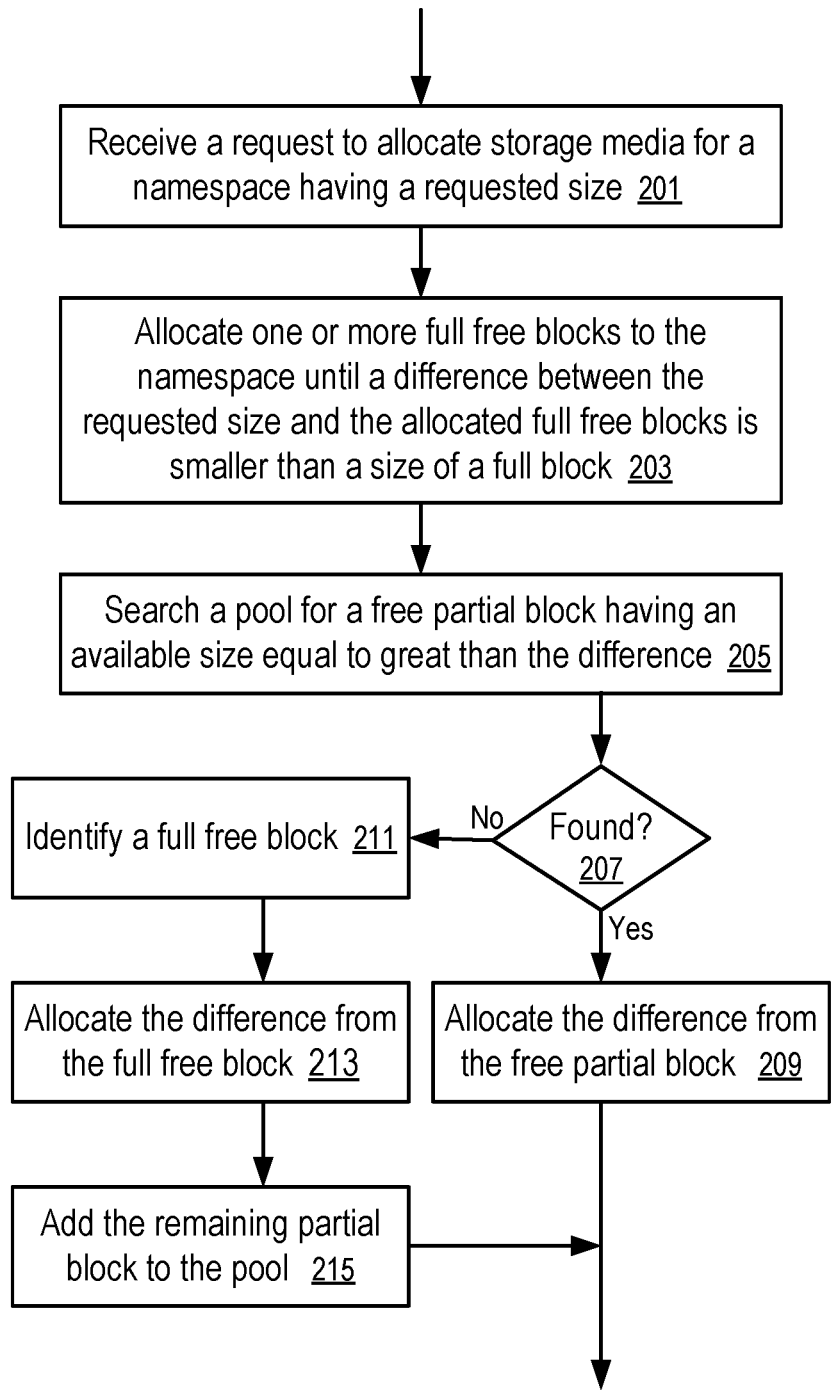
FIG. 12 shows a method to allocate a namespace on a storage device according to one embodiment.

FIG. 12 shows a method to allocate a namespace on a storage device according to one embodiment.

For example, the method of FIG. 12 can be implemented via executing the firmware (104) by the controller (107) of the storage device (103).

The method includes receiving (201) a request to allocate a portion of the non-volatile storage media (109) of the storage device (103) for a namespace (111) having a requested namespace size (131), which may or may not be a multiple of the size (133) of full L-blocks on the storage device (103).

In response to the request, the method further includes allocating (203) one or more full free L-blocks (121, . . . , and/or 123) to the namespace (111) until a difference between the requested namespace size (131) and the allocated one or more full free L-blocks (121, . . . , and/or 123) is smaller than the size (133) of a full L-block (e.g., 121, . . . , 123, or 127).

When the difference is smaller than the full block size (133), the method further includes searching (205) a free block pool (160) for one or more free partial blocks (161, 163, 165) having a total available size equal to or greater than the difference (113). Preferably, no more than one partial block is used for the difference.

If one or more free partial blocks (e.g., 161) that have a total size of available storage capacity equal to or greater than the difference (113) are found (207), the method further includes allocating (209) the difference (113) from the one or more free partial blocks (e.g., 161). If the available storage capacity is larger than the difference (113), the remaining unallocated one or more partial blocks are free and remain in the pool (160). If the available storage capacity is equal to the difference, the entirety of the one or more free partial blocks (e.g., 161) is allocated to the namespace (111) and thus removed from the free block pool (160).

If one or more free partial blocks having a total size of available storage capacity equal to or greater than the difference are not found (207), the method further includes: identifying (211) a full free block (e.g., 127); allocating (213) the difference (113) from the identified full free block (e.g., 127); and adding (215) the remaining partial block (115) of the identified full free block to the pool (160).

In some implementations, when there is no available full free block to successfully carry out the operation of identifying (211) a full free block for the difference, the method may report an error or warning, and/or attempt to use more than one free partial block (e.g., 161 and 163) to meet the difference.

When the namespace (111) is deleted, the partial block (113) allocated for the namespace (111) is freed and added to the free block pool (160); and full blocks (121, . . . , 123) allocated for the namespace (111) are also freed and become available for allocation to other namespaces. A routine of the firmware (104) detects and combines contiguous free partial blocks (e.g., 113 and 115) to reduce the numbers of partial free blocks in the pool (160). When partial free blocks (e.g., 113 and 115) in the pool (160) are combined into a full free block (127), the partial free blocks (e.g., 113 and 115) are converted into a free block representation (e.g., represented by the identification of a representative unit, such as a starting or ending unit).

For example, a computer storage device (103) of one embodiment includes: a host interface (105); a controller (107); and non-volatile storage media (109). The computer storage device (103) has firmware (104) containing instructions, which when executed by the controller (107), instruct the controller (107) to at least: receive, via the host interface (105), a request from a host (101) to allocate a namespace (111) of a requested namespace size (131) of non-volatile memory; generate, in response to the request, a namespace map (135) that identifies a plurality of L-blocks (121, . . . , 123), each having the same predetermined block size (133), and a partial L-block (113) having a size smaller than the predetermined block size (133); and convert, using the namespace map (135), logical addresses in the namespace (111) communicated from the host (101) to physical addresses (259) for the quantity of the non-volatile memory.

For example, the request to allocate the namespace (111) can be made using a protocol that is in accordance with Non-Volatile Memory Host Controller Interface Specification (NVMHCI) or NVMe.

For example, the computer storage device (103) can be a solid state drive (SSD).

For example, a method implemented in the computer storage device (103) includes receiving, in the controller (107) coupled with a non-volatile storage media (e.g., 109), a request from a host (101) to create or reserve a namespace (111) of a requested namespace size (131) of non-volatile memory from the non-volatile storage media (e.g., 109) of the computer storage device (103) (e.g., in accordance with NVMe). In response to the request, the method further includes generating, by the controller (107), a namespace map (135) that identifies: a plurality of L-blocks (121, . . . , 123) having a same predetermined block size (133), and a partial L-block (113) having a size smaller than the predetermined block size (133). The L-blocks (121, . . . , 123, 113) are further translated to specific portions of the non-volatile storage media (e.g., 109) (e.g., via a translation layer). After the namespace map (135) is generated for the namespace (111), the method further includes converting, by the controller (107) using the namespace map (135), logical addresses in the namespace (111) communicated from the host (101) to physical addresses for the quantity of the non-volatile memory.

Preferably, each of the plurality of L-blocks (121, . . . , 123) is represented in the namespace map (135) using a full block identifier (e.g., 141, . . . , or 143) that includes no more than an identification of a representative unit (e.g., a starting unit or an ending unit), in view of the known, uniform block size (133) of full blocks (121, . . . , 123, 127). Optionally, a full block identifier (e.g., 141, . . . , or 143) may include an indication of the block size (133) (e.g., by including both the identification of the starting unit, and the identification of the ending unit).

Preferably, the partial L-block (113) is represented in the namespace map (135) using an identifier (153) of a starting unit allocated for the namespace (111) and a chunk size (155). The starting unit is not necessarily the first unit in the full L-block (127) from which the partial block (113) is allocated. For example, when a subsequent namespace needs a partial block that has a size smaller than or equal to the remaining block (115), the partial block allocated for the subsequent namespace can have a starting unit that follows the ending unit of the partial block (113) in the L-block (127).

Alternatively, the partial L-block (113) can be represented in the namespace map (135) by an identification of an ending unit allocated for the namespace (111) (or another representative unit) and a chunk size (155).

Optionally, the method further includes maintaining, in the computer storage device (103), a free block pool (160) that identifies any partial L-block(s) (e.g., 127) available for allocation to another namespace.

Preferably, the computer storage device (103) stores a copy of the namespace map (135) and the free block pool (160) in the non-volatile storage media (e.g., 109) of the storage device (103) for persistent storage and uses a copy of the namespace map (135) and the free block pool (160) in the volatile DRAM (106) for computation.

As an example, generating the namespace map (135) can be performed via: allocating the plurality of L-blocks (121, . . . , 123) for the namespace (111) such that the size difference between the requested namespace size (131) of the namespace (111) and the plurality of L-blocks (121, . . . , 123) is smaller than the block size (133). After the determination of the difference between the quantity (133) of non-volatile memory requested for the namespace (111) and the total size of the plurality of full L-blocks (121, . . . , 123), the method further includes searching in the free block pool (160) for a partial L-block that is equal to or larger than the difference.

If a first partial L-block (e.g., 161), having a size larger than the difference, is found in the free block pool (160), the method further includes: allocating a portion of the first partial L-block (e.g., 161) for the namespace (111) (e.g., by creating a partial block identifier (147) for the namespace map (135)); and updating the first partial L-block (161) in the free block pool (160) to represent a remaining portion of first partial L-block (e.g., 161) that is not allocated for the namespace (111) and is free for allocation to another namespace.

If a first partial L-block (e.g., 161) having a size equal to the difference is found in the free block pool (160), the method further includes: removing the first partial L-block (e.g., 161) from the free block pool (160); and allocating the first partial L-block (e.g., 161) for the namespace (111).

If no partial L-block having a size equal to or larger than the difference is found in the free block pool (160), a full size free block (e.g., 127) may be allocated for the pool (160) and temporarily treated as a partial free block (e.g., 161). For example, the method further includes: adding a first L-block (e.g., 127) having the same predetermined block size (133) to the free block pool (160) (e.g., as the free block (161)); allocating a portion (113) of the first L-block for the namespace (111); and updating the first L-block (161) in the free block pool (160) to represent a remaining portion (115) of the first L-block (e.g., 127) that is not allocated for the namespace (111) and is free for allocation to another namespace.

Optionally, the method further includes receiving, in the controller (107), a request from the host (105) to delete the namespace (111), and adding, to the free block pool (160) by the controller (107) in response to the request, the partial L-block (113), identified by the partial block identifier (147) in the namespace map (135) of the namespace (111).

When the free block pool (160) has more than one partial free block (e.g., 113 and 115), the method optionally further includes: identifying, in the free block pool (160), contiguous free partial blocks (e.g., 113 and 115); and combining, in the free block pool (160), the contiguous free partial blocks (e.g., 113 and 115) into a single free partial block.

Optionally, the method further includes: after combining free partial blocks (e.g., 113 and 115) in the free block pool (160), determining whether a combined free partial block (e.g., 127) is a full free block that has the predetermined block size (133); and in response to a determination that the combined free partial block (e.g., 127) has the predetermined block size (133), removing the combined free partial block (e.g., 127) from the free block pool (160), such that the free block pool (160) contains only the identifications of partial free blocks; and free full blocks can be more efficiently represented by a list of full block identifiers, where each block in the free block pool (160) is represented by a partial block identifier having an identification of an unit in the block and a chunk size.

The techniques of allocating a namespace through namespace mapping of full and/or partial L-blocks, discussed above in connection with FIGS. 1-12, can be used to implement dynamic adjustment of namespace sizes, including namespace expansion, namespace reduction, and thin provisioning of namespaces, as further discussed below.

FIGS. 13-16 illustrate examples of adjusting sizes of namespaces through namespace mapping.

A namespace can be adjusted in size to add or remove an L-block of the predetermined block size (133).

Figure 13:
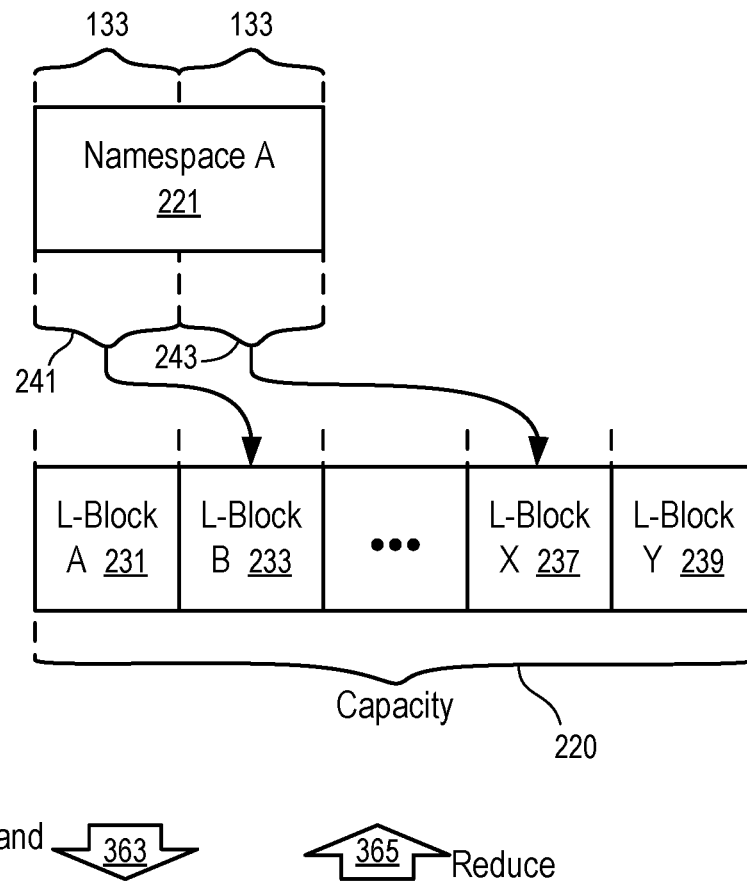
FIGS. 13-16 illustrate examples of adjusting sizes of namespaces through namespace mapping.
Figure 13:
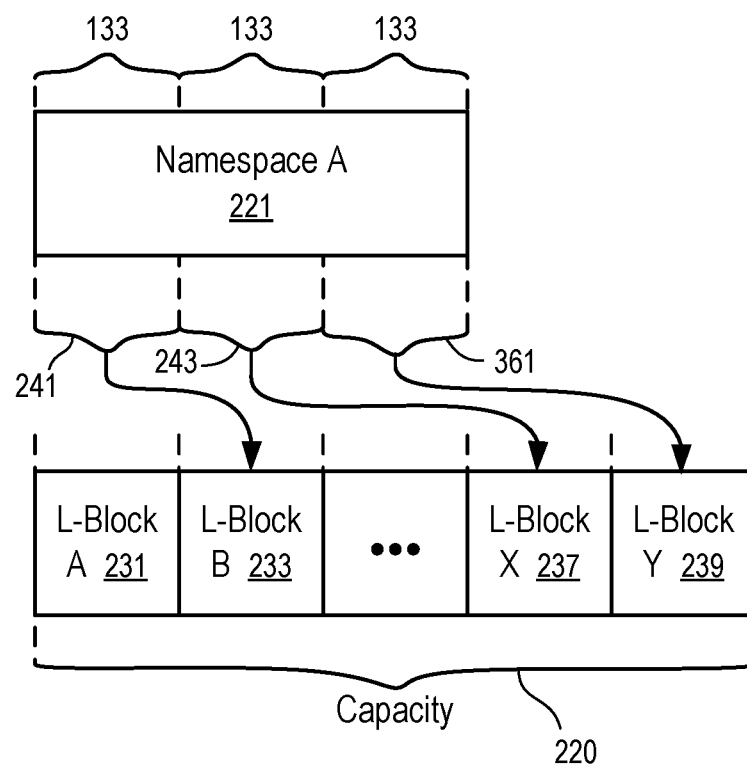

For example, FIG. 13 shows a name space (221) having blocks (241, 243) being mapped to L-blocks (233, 237) before being expanded (363) to have blocks (241, 243, 361) that are mapped to L-blocks (233, 237, 239) respectively.

To expand the namespace (221) by a block (361) having the predetermined block size (133), the namespace map (e.g., 273) of the namespace (221) is updated to include the identification of the L-block (239) that is allocated as the expanded capacity of the namespace (221).

For example, to expand the namespace (221) by a block (361), the controller (107) executing the firmware (104) identifies a free L-block (239) (e.g., from a free block pool (160) or the free list (275)) that has not yet been allocated to an existing namespace, and allocates the L-block (239) to the namespace (221) by including an identification of the L-block (239) in the namespace map (e.g., 135 or 273) of the namespace (221) and removing the identification of the L-block (239) from the free block pool and list (160 or 275).

In the reverse direction, FIG. 13 also shows a name space (221) having blocks (241, 243, 361) that are mapped to L-blocks (233, 237, 239) respectively before being reduced (365) to have blocks (241, 243) that are mapped to L-blocks (233, 237) respectively.

To shrink the namespace (221) by a block (361) having the predetermined block size (133), the namespace map (e.g., 273) of the namespace (221) is updated to remove the identification of the L-block (239) that corresponds to the removed capacity of the namespace (221).

For example, to shrink the namespace (221) by a block (361), the controller (107) executing the firmware (104) identifies the L-block (239) mapped to the last block (361) of the namespace (221) in the namespace map (e.g., 135 or 273) of the namespace (221), removes the identification of the L-block (239) from the namespace map (e.g., 135 or 273) of the namespace (221), and adds the identification of the L-block (239) to a free block list (e.g., a free block pool (160) or the free list (275)) such that the L-block (239) may be subsequently allocated to another namespace (or the namespace (221) when needed or requested).

Figure 14:
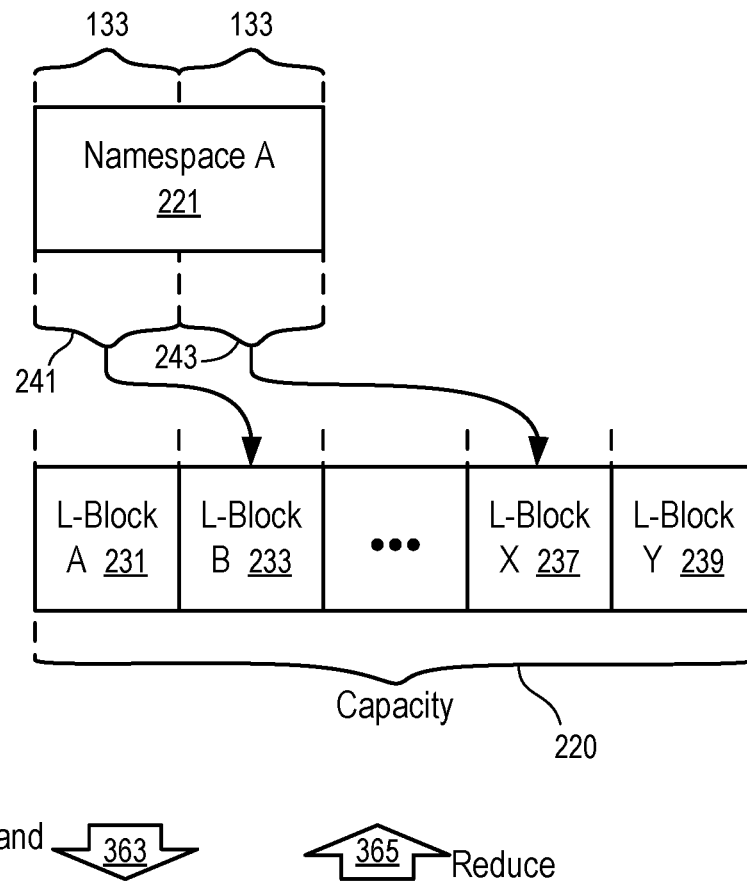
Figure 14:
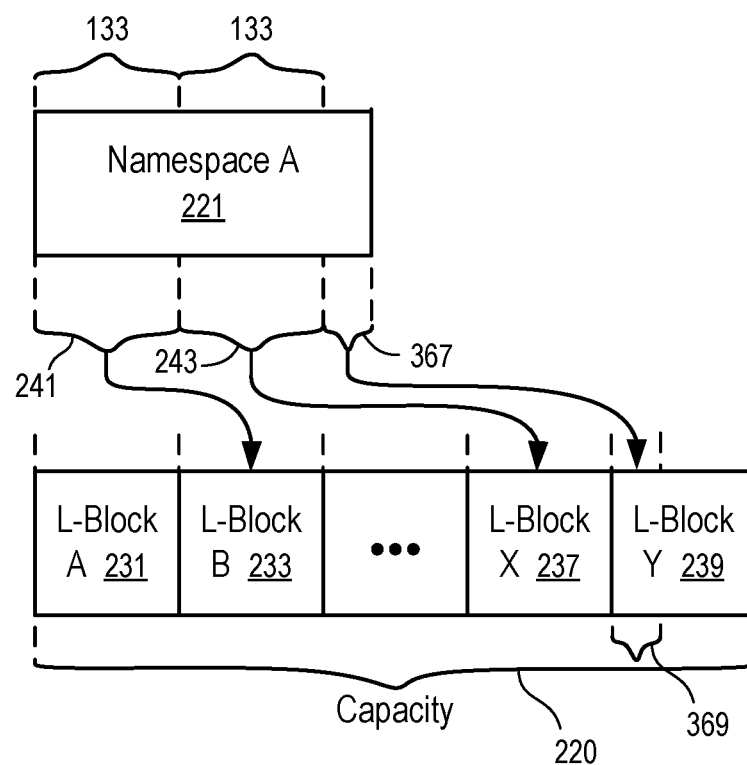

FIG. 14 illustrates an example of expanding a namespace by a partial L-block and/or reducing a namespace by a partial L-block.

For example, a name space (221) having blocks (241, 243) being mapped to L-blocks (233, 237) in FIG. 14 is expanded (363) to have full blocks (241, 243) and a partial block (367) that are mapped to L-blocks (233, 237) and a partial L-block (239) respectively.

To expand the namespace (221) by an added capacity of a partial block (367) smaller than the predetermined block size (133), the namespace map (e.g., 135 or 273) of the namespace (221) is updated to include the identifier of the partial L-block (369) that is allocated from a full block (239), as the expanded capacity of the namespace (221).

For example, to add the capacity of a partial block (367) to the namespace (221), the controller (107) executing the firmware (104) identifies a free partial L-block (369) having the corresponding size (e.g., allocated from a free full block or a free partial block from a free block pool (160) or the free list (275)), and adds the identification (e.g., using an identifier illustrated in FIG. 4) of the partial L-block (239) to the namespace (221) (e.g., as illustrated in FIG. 3).

Preferably, the namespace (221) is mapped to no more than one partial L-block (239). Preferably, the full-size L-blocks (231, 233, . . . , 237) of the namespace (221) are contiguous in the capacity (220). A remapping technique (e.g., as discussed in connection with FIG. 17) can be used to optimize the namespace mapping by consolidating partial and full-size L-blocks so that the full-size L-blocks (231, 233, . . . , 237) of the namespace (221) are contiguous in the capacity (220) and the namespace (221) has no more than one partial L-block (239).

In a reverse direction, a name space (221) having full blocks (241, 243) and a partial block (367) that are mapped to full L-blocks (233, 237) and a partial L-block (369) can be reduced (365) to have blocks (241, 243) that are mapped to full L-blocks (233, 237) respectively.

To shrink the namespace (221) by removing the capacity of a partial block (367), the namespace map (e.g., 273) of the namespace is updated to remove the partial block identifier (147) of the L-block (369) that corresponds to the removed capacity of the namespace (221). The removed L-block (369) is returned to the free block pool (160) where it can be combined with other free partial block(s) to form a free full L-block (239).

Figure 15:
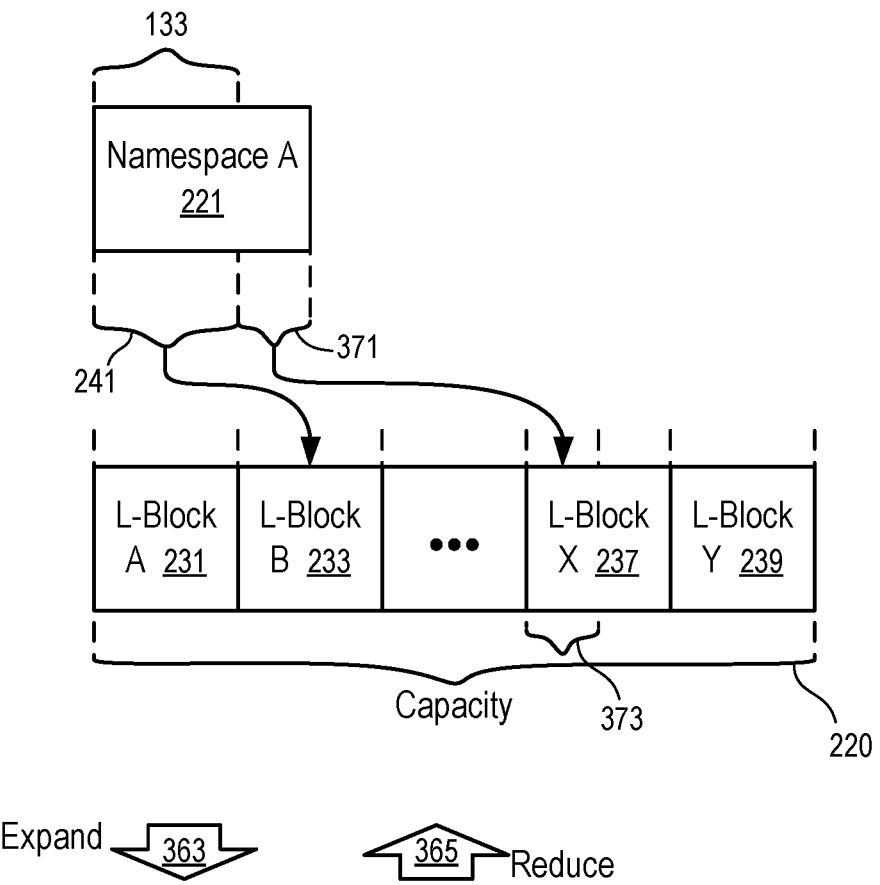
Figure 15:
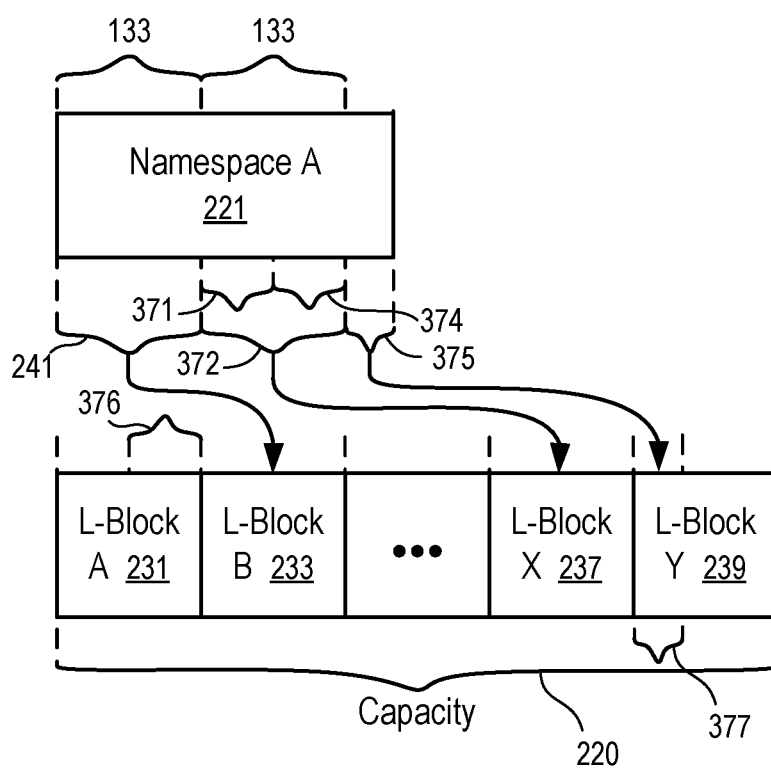

FIG. 15 illustrates an example in which the namespace (221) has a partial block (371/375) before and after the size change.

For example, a namespace (221) having a full block (241) and a partial block (371) that are mapped to a full L-block (233) and a partial L-block (373) in FIG. 15 can be expanded (363) to have full blocks (241, 372), and a partial block (375) that are mapped to full L-blocks (233, 237) and a partial L-block (377) respectively.

In FIG. 15, the L-block (237) from which the partial L-block (373) is allocated has a free capacity that allows the partial L-block (373) to be expanded to the full L-block (237) to accommodate the expanded capacity (372).

Figure 17:
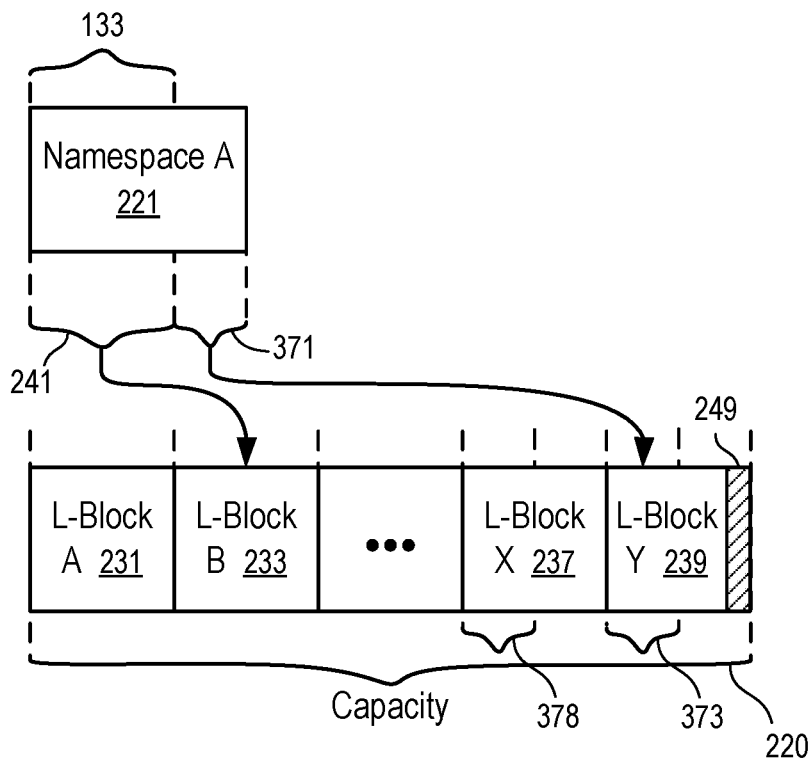
FIG. 17 illustrates remapping of a namespace.
Figure 17:
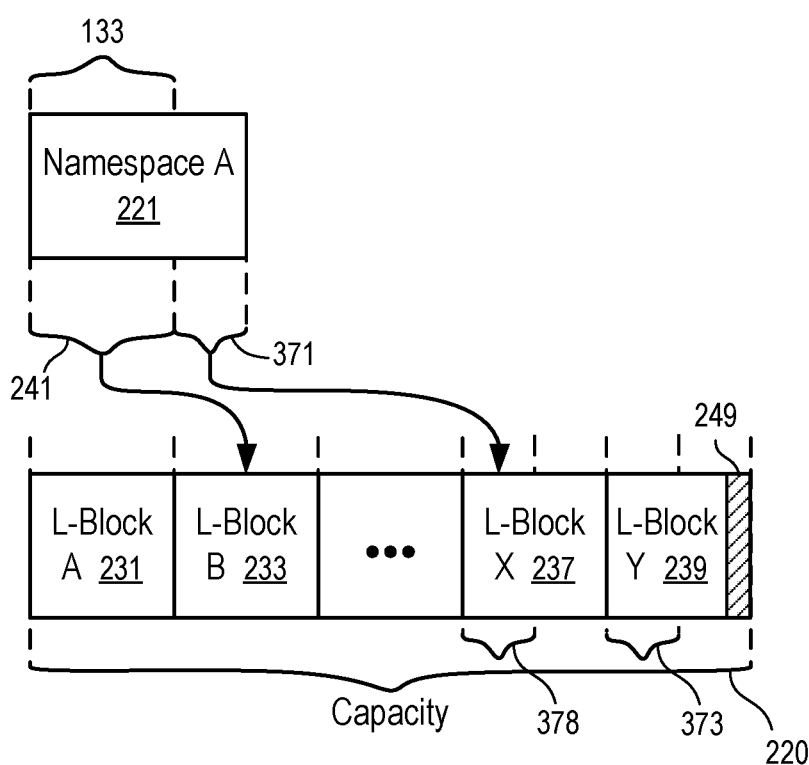

In other instances, when the L-block (237) from which the partial L-block (373) is allocated does not have a free capacity that allows the partial L-block (373) to be expanded to the full L-block (237) (e.g., when another portion of the L-block (237) is currently allocated to another namespace, similar to the situation where the block (239) in FIG. 11 has multiple portions allocated to different namespaces (221 and 223)), the initial partial block (371) can be remapped to another L-block (e.g., 231) (e.g., as illustrated in FIG. 17) to allow its expansion to a full L-block (e.g., 231).

Alternatively, one or more partial L-blocks (e.g., 371, 374) are allocated for the expanded block (372), which can be subsequently combined into a full block via remapping. For example, the portions (371 and 374) of the expanded block (372) can be mapped to partial L-blocks (373 and 376) respectively as an initial response to expand the namespace (221); and subsequently, the mapping to the partial L-blocks (376) can be remapped to the available portion in L-block (237) from which the partial L-block (373) is allocated to form a full L-block (273) that is allocated the namespace (221). Alternatively, the mapping to the partial L-blocks (373) can be remapped to the available portion in L-block (231) from which the partial L-block (376) is allocated to form a full L-block (231) that is allocated to the namespace (221). Alternatively, the partial L-blocks (373 and 376) can be remapped into another full free L-block.

To expand (363) the namespace (221) to include the partial block (375), a partial L-block (377) can be added to the namespace map (e.g., 135 or 273) in a way as illustrated in FIG. 14 for the addition of a partial block (367).

In a reverse direction, a namespace (221) having full blocks (241, 372) and a partial block (375) that are mapped to full L-blocks (233, 237) and a partial L-block (377) can be reduced (365) to have a full block (241) and a partial block (371) that are mapped to a full L-block (233) and a partial L-block (237) respectively, by returning the partial L-block (237) and a portion of the L-block (237) to a free block pool (160) and/or a free list (275) of full L-blocks.

Figure 16:
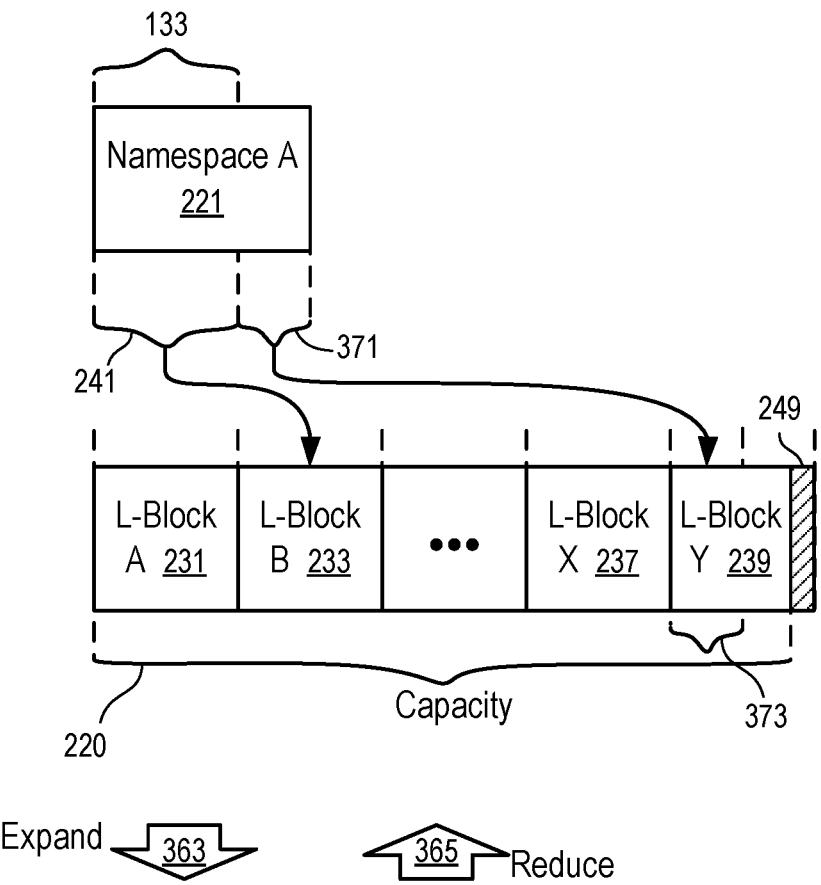
Figure 16:
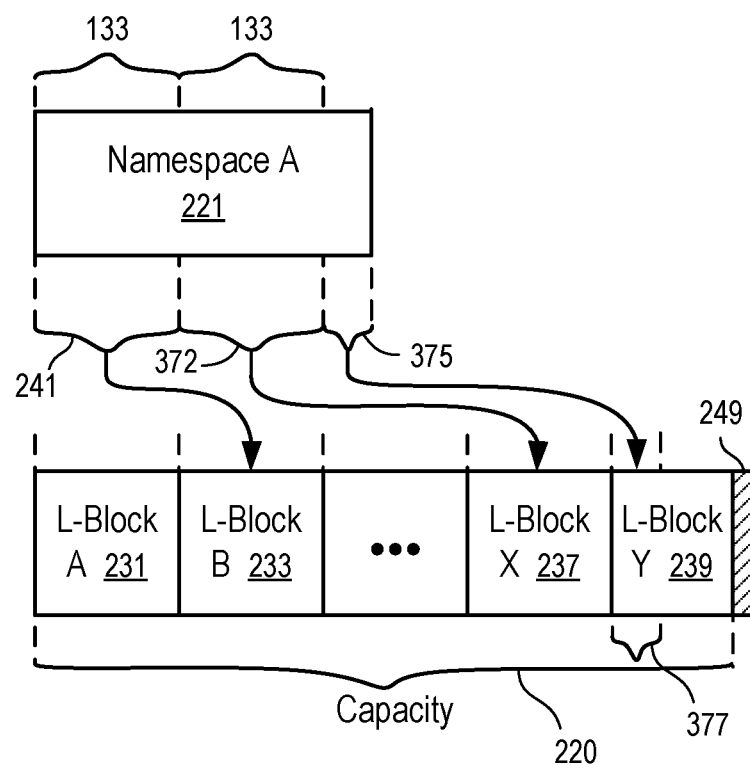

FIG. 16 shows an example of expanding a partial L-block to a full L-block through remapping.

In FIG. 16, a partial block (371) of the namespace (221) is initially mapped to a partial L-block (373) that is allocated from an L-block (239) that does not have sufficient free capacity to be expanded to accommodate a full block of the predetermined block size (133).

When the partial block (371) is expanded (363) into a full block (372), the partial L-block (373) allocated from the L-block (239) cannot be expanded in-place in L-block (239) to a full L-block due to the limitation in the L-block (239). In FIG. 16, the L-block (239) is limited as a result of the capacity (220) being not a multiple of the block size (133). L-block (239) may be considered a partial L-block allocated from a full L-block that contains a portion (249) of virtual capacity that is not actually available in the non-volatile storage media (109). In other instances, the portion (249) may be available in the non-volatile storage media (109), but is currently allocated to another namespace, which prevents the in-place mapping expansion of the partial block (371).

In FIG. 16, when the partial block (371) is expanded (363) into the full block (372), the full block (372) is mapped to another L-block (237) instead of being mapped to the L-block (239) through local expansion. The partial L-block (373) initially allocated to the partial block (371) is freed, from which a partial L-Block (377) is allocated for the added partial block (375) of the namespace (221).

The L-block allocation example of FIG. 16 can be implemented by initially remap the partial block (371) to a partial L-block allocated from the L-block (237) and then expand the namespace (221) in a way as illustrated in FIG. 15. Alternatively, the added capacity of the namespace (221) is initially mapped to partial L-blocks that are subsequently consolidated into the full L-block (237) and the partial L-block (239) via remapping.

In the reverse direction, the namespace (221) can be reduced (365) from having full blocks (241, 372) and a partial block (375), mapped to full L-blocks (233, 237) and a partial L-block (377), to having a full block (241) and a partial block (371) that are mapped to an L-block (233) and a partial L-block (373). The reduction can be implemented via freeing the partial L-block (377), a portion of the L-block (237), and then remapping the remaining portion of the L-block (237) allocated to the block (371) to the partial L-block (373) in the L-block (239) (e.g., remapped to reduce fragmentation of the capacity (220)).

FIG. 17 illustrates remapping of a namespace.

In FIG. 17, the partial block (371) is remapped (379) from a partial L-block (373) allocated from one location in the capacity (220) to another partial L-block (378) allocated from another location in the capacity (220).

To implement the remapping illustrated in FIG. 17, the controller (107) executing the firmware (104) copies the data from the partial L-block (373) to the partial L-block (378), and replaces, in the namespace map (135 or 273) of the namespace (221), the identifier of the partial L-block (373) with the identifier of the partial L-block (378).

FIG. 17 illustrates an example of remapping a partial block (371) to different locations in the capacity (220). The technique can be similarly used to remap (379) full blocks (e.g., 241).

The remapping technique can be used to optimize namespace maps (e.g., 135, 273) such that full L-blocks (231, 233, ..., 237) allocated for the namespace (221) are in a contiguous section on the capacity, and/or partial L-blocks (369) are combined to reduce the number of free partial L-blocks in the system.

Preferably, remapping is performed in the background to minimize the performance impact in data accessing. As the namespace maps (e.g., 135, 273) are optimized, the computation overhead associated with namespace mapping is reduced; and the data access performance of the storage device (103) is improved.

The techniques discussed above can be used to implement commands, received from the host (101) to change, expand, or shrink the requested namespace size (131) of an existing namespace (221) that has been mapped to the non-volatile storage media (109).

Further, the techniques discussed above can be used to implement thin provisioning of a namespace (221).

Figure 18:
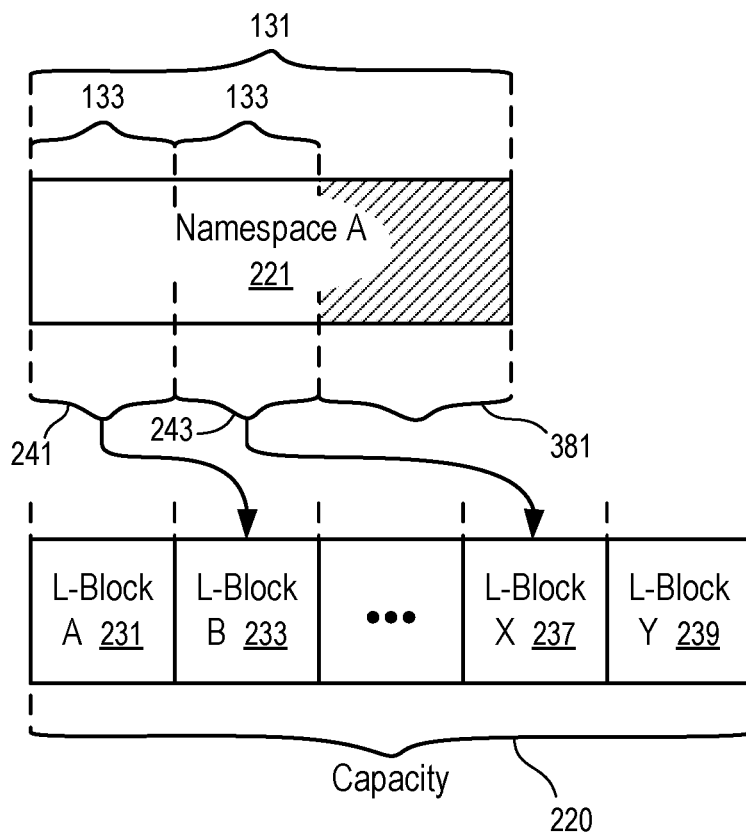
FIGS. 18 and 19 illustrate thin provisioning of a namespace via namespace mapping.
Figure 19:
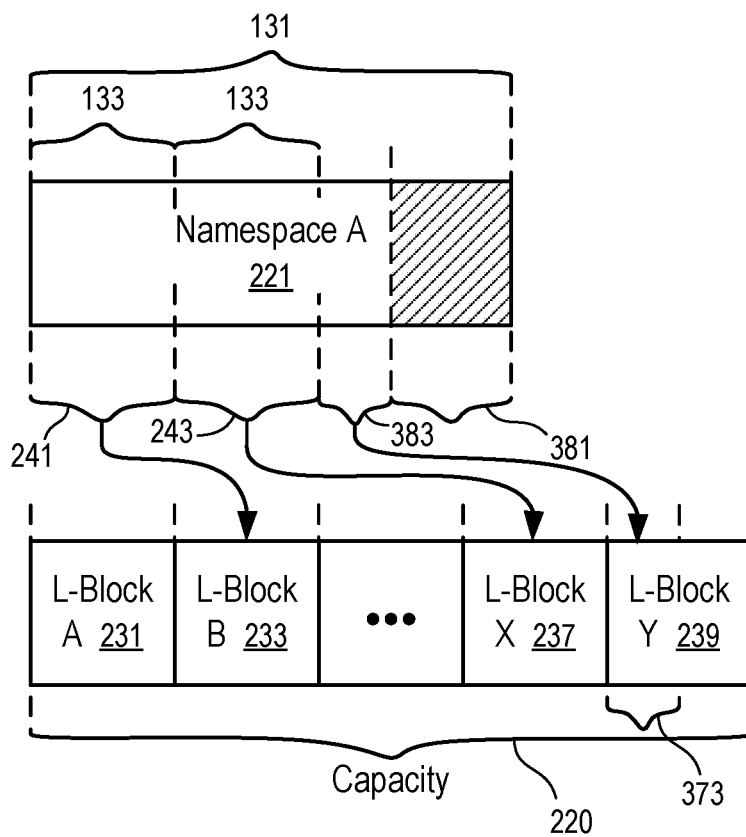

FIGS. 18 and 19 illustrate thin provisioning of a namespace via namespace mapping.

In FIGS. 18 and 19, the namespace (221) is created with a requested namespace size (131). However, only a portion of the namespace (221) (e.g., blocks 241 and 243) is initially allocated for the namespace (221) via its namespace map (e.g., 135, 273). For example, the blocks (241 and 243) are mapped to L-blocks (233 and 237) respectively; and the allocation of the remaining portion (381) of the namespace (221) is postponed until a later stage when additional storage capacity in the remaining portion (381) is needed.

In response to a need to use the remaining portion (381), a further partial block (383) (or a full block) of the namespace (221) is mapped to a partial L-block (373) (or a full L-block). Thus, the remaining unallocated portion (381) of the namespace (221) is reduced.

The incremental provisioning of the allocated portion of the namespace (221) can be managed automatically by the controller (107) with or without explicit requests from the host (101).

Figure 20:
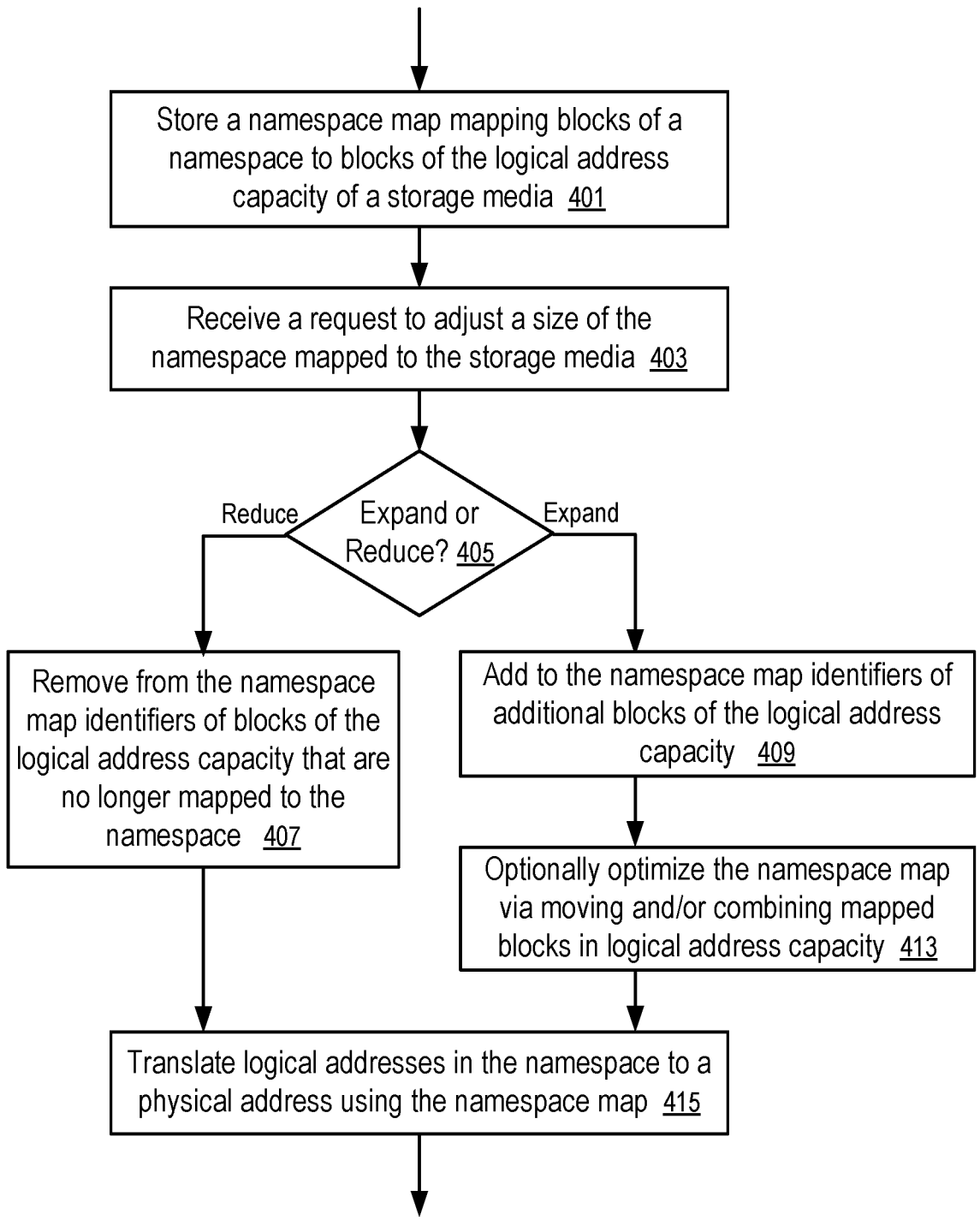
FIG. 20 shows a method to adjust a namespace via adjusting a namespace map.

FIG. 20 shows a method to adjust a namespace (e.g., 221) via adjusting a namespace map.

For example, the method of FIG. 20 can be used to implement the namespace changes illustrated in FIGS. 13-19 in a storage device (103) illustrated in FIG. 1 using data structures illustrated in FIGS. 4 and/or 8-10. For example, the method of FIG. 20 can be programmed via the firmware (104) and executed by the controller (107).

In FIG. 20, the method includes storing (401) a namespace map (e.g., 135 or 273) mapping blocks (e.g., 241, 383) of a namespace (221) to blocks (e.g., 233, 373) of the logical address capacity (220) of a non-volatile storage media (109). The namespace map (e.g., 135 or 273) can be created in response to allocating the namespace (221) (e.g., in a way as illustrated in FIG. 3, 7, or 11).

After receiving (403) a request to adjust a size of the existing namespace (221) mapped to the non-volatile storage media (109), the method determines (405) whether the request is to expand or reduce the allocation of the namespace (221) on the non-volatile storage media (109).

In response to a determination (405) to reduce the allocation of the namespace (221) on the non-volatile storage media (109), the method further includes removing (407) from the namespace map (e.g., 241, 383) identifiers of blocks of the logical address capacity that are no longer mapped/allocated to the namespace (221).

In response to a determination (405) to expand the allocation of the namespace (221) on the non-volatile storage media (109), the method further includes adding (409) to the namespace map (e.g., 241, 383) identifiers of additional blocks of the logical address capacity.

For example, as illustrated in FIG. 13, the identifier of a full L-block (239) is added to the namespace map (e.g., 241, 383) of the namespace (221) to expand the namespace (221) by the full block (361).

For example, as illustrated in FIG. 14, the identifier of a partial L-block (369) is added to the namespace map (e.g., 241, 383) of the namespace (221) to expand the namespace (221) by a partial block (367).

In some instances (e.g., as illustrated in FIG. 15), the identifier of a full L-block (e.g., 237) is added to replace the identifier of a partial L-block (e.g., 373) that is expanded to the full L-block (e.g., 237) in allocation.

Optionally, the method further includes optimizing (413) the namespace map (e.g., 241, 383) via moving and/or combining mapped blocks in logical address capacity (220). For example, the mapping of the partial block (371) on the capacity (220) may be moved from the partial L-block (373) to the partial L-block (378) illustrated in FIG. 17 to prepare the expansion of the partial block (371) to a full block, or to combine with a partial block allocated from the L-block (237) to accommodate the expansion of the partial block (371). For example, the mapping to the full L-blocks on the capacity (220) can be moved around to consolidate the full L-blocks allocated to the namespace (221) in a contiguous segment.

The method of FIG. 20 includes translating (415) logical addresses defined in the namespace (221) to mapped logical addresses (257) defined on the entire capacity (220) of the storage device (103) and then to physical addresses (259) using the namespace map (e.g., 241, 383).

For example, a logical address in a block (e.g., 241, 371) of the namespace can be linearly mapped to the corresponding address (257) in the L-block (e.g., 233, 378) of the capacity (220), which can then be further mapped to a physical address (e.g., 259) (e.g., by a Flash Translation Layer (FTL) of a solid state drive (SSDs)) in a way independent of namespaces.

For example, the computer storage device (103) illustrated in FIG. 1 has a host interface (105), a controller (107), non-volatile storage media (109), and firmware (104). The firmware (104) instructs the controller (107) to: store a namespace map (e.g., 135, 273) that maps blocks of logical addresses defined in a namespace (111 or 221) to blocks of a logical address capacity (220) of the non-volatile storage media (109); adjusts the namespace map (e.g., 135, 273) to change a size of the namespace (111 or 221); and translates logical addresses defined in the namespace (111 or 221) to physical addresses (259) for the non-volatile storage media (109) using the namespace map (e.g., 135, 273) that first maps the logical addresses defined in the namespace (111 or 221) to the logical addresses in the logical address capacity (220) of the non-volatile storage media (109).

The namespace map (e.g., 135, 273) can be adjusted in response to a request for a host (101) to increase (363) the size of the namespace (111 or 221), where the adjustment can be performed via adding an identifier of a block of the logical address capacity (220) for association with the namespace (111 or 221).

The namespace map (e.g., 135, 273) can be adjusted in response to a request for a host (101) to reduce (365) the size of the namespace (111 or 221), where the adjustment can be performed via removing an identifier of a block of the logical address capacity (220) from association with the namespace (111 or 221).

In implementing thin provisioning, the namespace map (e.g., 135, 273) can be adjusted in response to an increase in demand of allocated capacity of the namespace (111 or 221) with or without an explicit request from the host (101).

Preferably, the logical address capacity (220) of the non-volatile storage media (109) is divided into predetermined blocks having a same, predetermined block size (133) that is a power of two.

In one scenario, before the size of the namespace (111 or 221) is changed, the namespace (111 or 221) has a partial block (371) having a size smaller than the predetermined block size (133), and the partial block (371) is mapped by the namespace map (e.g., 135, 273) to a portion (373) of a first particular block (239) of the predetermined blocks. After the size of the namespace (111 or 221) is changed, the size of the partial block (371) is increased, and the expanded first block (372) is mapped by the namespace map (e.g., 135, 273) to at least a portion of a second particular block (237 or 239) of the predetermined blocks, as illustrated in FIGS. 15 and 16.

The second particular block can be different from the first particular block, as illustrated in FIG. 16.

To implement a scenario as illustrated in FIG. 16, the namespace map (e.g., 135, 273) can be adjusted via: copying data from the portion (373) of the first particular block (239) to a corresponding portion (378) of the second particular block (237) (e.g., as illustrated in FIG. 17); and replacing in the namespace map (e.g., 135, 273) an identifier of the portion (373) of the first particular block (239) with an identifier of the corresponding portion (378) of the second particular block (237). The allocation of the corresponding portion (378) of the second particular block (237) can then be expanded on the second particular block (237) to accommodate the expansion.

In an alternative way to implement a scenario as illustrated in FIG. 16, the namespace map (e.g., 135, 273) can be adjusted via: dividing the at least portion of the second particular block (237) into a first portion and a second portion, where the second portion (378) is reserved to receive a copy of the content from the portion (373) of the first particular block (239); and adding to the namespace map (e.g., 135, 273) an identifier of the first portion of the second particular block (237). After the size of the namespace (111 or 221) has changed, a background process is used to copy data from the portion (373) of the first particular block (239) to the second portion (378) of the second particular block (237). Subsequently, the controller (107) replaces in the namespace map (e.g., 135, 273) an identifier of the portion (373) of the first particular block (239) and the identifier of the first portion of the second particular block (237) with an identifier of the at least a portion of the second particular block (237).

After the size of the namespace (221) is changed, the size of the first block (371) can be increased to the predetermined block size (133); and a partial block identifier can be replaced with a full block identifier.

One embodiment disclosed herein includes a storage device configured with a set of registers to store crypto keys for namespaces allocated on the storage device. Each register stores, for one namespace, a different crypto key that is generated upon the allocation of the namespace such that the content stored in the namespace cannot be decrypted through data access made outside of the namespace (e.g., through data access made in another namespace). The crypto key of the namespace can be destroyed upon deletion of the namespace to perform a cryptographic erasure of the content stored in the namespace. During the lifetime of the namespace, a portion of the storage device storing data in the namespace may be freed and made available to another namespace (e.g., in response to a command reducing the size of the namespace, or in response to moving the data of the namespace from a physical portion of the storage device to another physical portion of the storage device). Since the data stored in the portion of the storage device cannot be decrypted outside of the namespace, the portion storing the data for the namespace can be freed without first erasing the stored data and/or without destroying the crypto key.

Data stored under a namespace may be in an encrypted form that is to be decrypted using a key that is specific for the namespace. For example, a storage device can be configured with a register file that has the capacity to hold a predetermined number of crypto keys. When a namespace is created, a different crypto key is generated and stored in a corresponding register in the file. A combination of the register and a crypto engine implemented on the storage device can minimize performance impact on data access made in the namespace. A cryptographic erasure of the content stored in the namespace can be performed by simply destroying the crypto key and removing the crypto key from the storage device.

During the lifetime of the encrypted namespace, a portion of the storage device that stores data in the namespace may be freed and made available to another namespace. For example, when a command is received to reduce the size of the namespace, a portion of the storage space allocated to the namespace is removed from the namespace and made available to another namespace. For example, to consolidate logical addresses that are defined on the entire capability of the storage device and that are allocated to the namespace, the storage device may copy or mirror the data stored in a source portion of the storage device to a destination portion of the storage device and then free the redundant source portion of the storage device. Since the data stored in the portion of the storage device is freed from a namespace and thus cannot be decrypted outside of the namespace, the portion can be freed without physically erasing the data stored on the portion and without cryptographically erasing the data by destroying the crypto key of the namespace.

Figure 21:
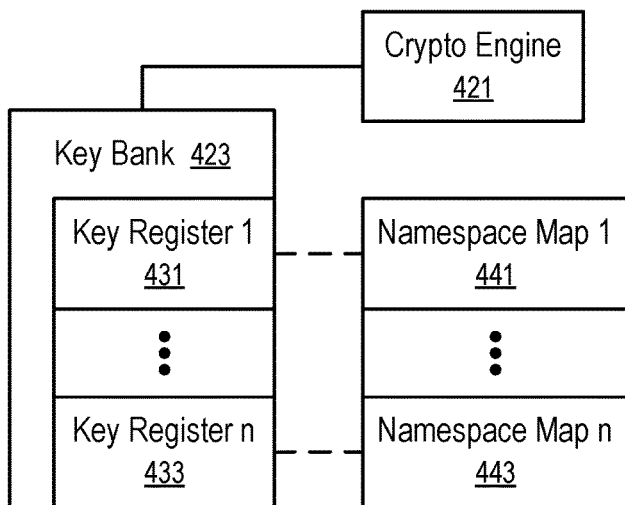
FIG. 21 shows a crypto structure of a storage device.

FIG. 21 shows a crypto structure of a storage device. For example, the structure of FIG. 21 can be implemented in the storage device (103) illustrated in FIG. 1.

In FIG. 21, a key bank (423) has a set of key registers (431, . . . , 433). Each of the registers (431, . . . , 433) is fixedly associated with only one namespace (e.g., 221, 223) and can be used only for data access made in the associated namespace (e.g., 221, 223). In response to the creation of a namespace (e.g., 221, 223), a namespace map (441, . . . , or 443) is created to map the logical addresses defined in the namespace (e.g., 221, 223) to logical addresses defined in the entire capacity (220) of the storage device (103). Further, in response to the creation of a namespace (e.g., 221, 223), a crypto key is generated and stored in a key register (431, . . . , or 433) that corresponds to the namespace map (441, . . . , or 443).

In FIG. 21, a crypto engine (421) is configured to encrypt and/or decrypt data using keys storing the key bank (423). The selection of a key for the encryption or decryption of a given data packet is made by the crypto engine (421) in accordance with the namespace (e.g., 221, 223) and/or its namespace map (441, . . . , or 443) used to resolve logical addresses used for storing or retrieving the data packet. When the address of the data packet is specified as a logical address in a namespace (e.g., 221, 223), the crypto key of the namespace (e.g., 221, 223) is retrieved for application to the data packet and the corresponding namespace map (e.g., 441, . . . , 443) retrieved to identify a corresponding logical address defined in the capacity (220) of the storage, which logical address is then converted to a physical address in a namespace-independent way for the storing or retrieving of the data packet.

Preferably, each allocated namespace (e.g., 221, 223) on the storage device (103) has a different crypto key stored in the corresponding register (431, . . . , or 433) in the key bank (423). Since the data stored in one namespace (e.g., 221) cannot be decrypted in another namespace (e.g., 223), the physical storage elements previously used by one namespace (e.g., 221) can be freed for use by another namespace (e.g., 223) without first erasing the data stored in the physical storage elements.

In some implementations, the crypto keys stored in the key bank (423) are accessible only to the crypto engine (421) and cannot be retrieved to outside of the crypto engine (421).

In some implementations, the crypto keys stored in the key bank (423), or in a non-volatile memory, are in an encrypted form to prevent unauthorized access. The crypto engine (421) is configured to decrypt a retrieved, encrypted crypto key for a namespace (e.g., 221, 223) that has an associated namespace map (441) only after authenticating a credential for accessing the namespace (e.g., 221, 223).

In some implementations, the association between the key registers (431, . . . , 433) and the namespace maps (441, . . . , 443) is hard wired in the storage device (103) to prevent unauthorized modifications of the connections between the crypto keys and the namespaces, which modification may provide unauthorized access to the content of one namespace under another namespace.

In some implementations, an encrypted copy of the namespace maps (441, ..., 443) and their crypto keys is stored in a non-volatile storage media (e.g., 109) reserved for the crypto engine (421). After performing authentication, the crypto engine (421) decrypts the copy in the crypto engine (421) to process data accesses made using the namespace maps (441, ..., 443) and the corresponding crypto keys.

In some implementations, the crypto engine (421) associates the crypto keys and the namespace maps (441, ..., 443) in a section of the volatile DRAM (106) reserved for the crypto engine (421), or inside the circuitry of the crypto engine (421).

Figure 22:
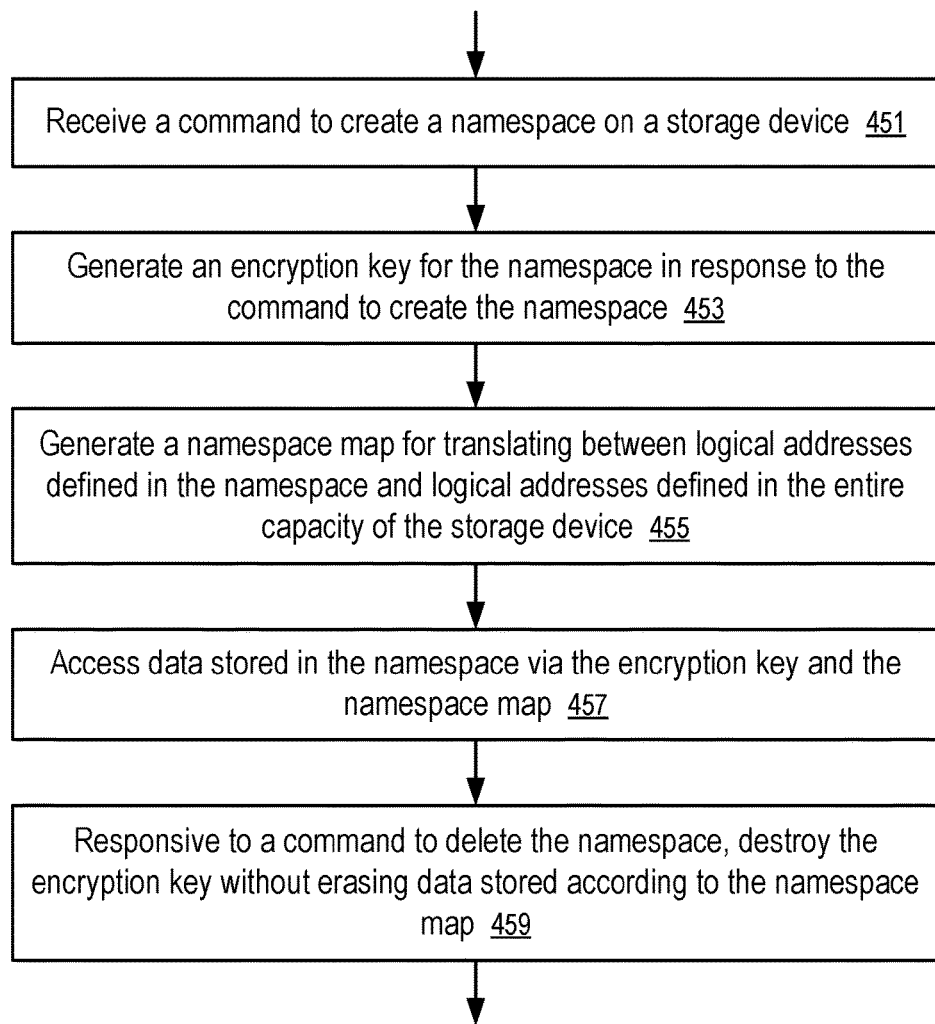
FIG. 22 shows a method to encrypt a namespace.

FIG. 22 shows a method to encrypt a namespace. For example, the method of FIG. 22 can be implemented in the storage device (103) illustrated in FIG. 1 using a crypto structure illustrated in FIG. 21.

The method of FIG. 22 includes: receiving (451) a command (261) to create a namespace (e.g., 221, 223) on a storage device (103); generating (453) an encryption key for the namespace (e.g., 221, 223) in response to the command (261) to create the namespace (e.g., 221, 223); generating (455) a namespace map (e.g., 441, ..., 443) for translating between logical addresses defined in the namespace (e.g., 221, 223) and logical addresses defined in the entire capacity (220) of the storage device (103), where the logical addresses defined in the entire capacity (220) of the storage device (103) are translated to physical addresses on the storage device (103) in a way independent of namespaces; accessing (457) data stored in the namespace (e.g., 221, 223) via the encryption key and the namespace map (e.g., 441, ..., 443); and responsive to a command (263) to delete the namespace (e.g., 221, 223), destroying (459) the encryption key to perform a cryptographic erasure of the content of the namespace (e.g., 221, 223) without actually erasing the data stored in the namespace (e.g., 221, 223) according to the namespace map (e.g., 441, ..., 443).

As illustrated in FIG. 21, the encryption key may be stored in a key register (431, ..., 433) dedicated to the namespace (e.g., 221, 223) having the corresponding namespace map (e.g., 441, ..., 443). A symmetric encryption method may use the encryption key in both encrypting data and decrypting the encrypted data. Alternatively, a non-symmetric encryption method can be used, where a first crypto key is used to convert original data to encrypted data and a second crypto key corresponding to the first crypto key is used to convert the encrypted data back to the original data. The first and second crypto keys are associated with the namespace (e.g., 221, 223) for the encryption of data stored in the storage device under the namespace (e.g., 441, ..., 443) and for the decryption of the retrieved encrypted data from the namespace (e.g., 441, ..., 443).

In some implementations, the crypto engine (421) performs encryption using a non-symmetric encryption method. For example, when the host (101) sends a namespace creation command (261) to the storage device (103) via the host interface (105) to create a namespace (e.g., 221, 223), the host (101) provides a public key of the namespace (e.g., 221, 223) to the storage device (103). The public key of the namespace (e.g., 221, 223) is stored in a key register (e.g., 431, ..., 433) that is associated with the namespace map (e.g., 441, ..., 443) of the name space (e.g., 221, 223). Data received from the host (101) for storage at logical addresses defined in the namespace (e.g., 221, 223) is encrypted by the crypto engine (421) using the public key of the namespace (e.g., 221, 223) before being stored in the non-volatile storage media (109) of the storage device (109). Thus, the data stored in the namespace (e.g., 221, 223) cannot be decrypted without the private key of the namespace (e.g., 221, 223).

Optionally, the host (101) may also provide the private key of the namespace (e.g., 221, 223) to the crypto engine (421) to offload decryption operations to the crypto engine (421) for retrieving data from the namespace (e.g., 221, 223). Alternative, the data encrypted in the namespace (e.g., 221, 223) using the public key is to be retrieved for decryption by a separate device (e.g., the host (101)) that is in possession of the corresponding private key.

For example, the private key of the namespace (e.g., 221, 223) is not provided to and/or stored in the storage device (103). Thus, if the storage device (103) is stolen and/or connected to an alternative host that does not have the private key of the namespace (e.g., 221, 223), the alternative host cannot decrypt the content retrieved from the storage device (103) where the content is encrypted with the public key of the namespace (e.g., 221, 223).

In some applications, upon creation of a namespace (e.g., 221, 223), the crypto engine (421) generates a pair of public key and private key for the namespace (e.g., 221, 223). The crypto engine (421) provides the public key of the namespace (e.g., 221, 223) to the host (101) and stores the private key for the decryption of data retrieved from the namespace (e.g., 221, 223) (e.g., after the access to the namespace (e.g., 221, 223) is authenticated). The host (101) may optionally perform encryption on data to be stored on the storage device (103) using the public key of the namespace (e.g., 221, 223). By keeping the private key to itself, the crypto engine (421) can perform a cryptographic erasure of the content of the namespace by simply deleting the private key from the storage device (103).

In some implementations, the crypto engine (421) stores, for a namespace (e.g., 221, 223) and in the key bank (423), a first key that is not available outside of the storage device (103) for the decryption of the content stored in the namespace (e.g., 221, 223) and a second key for encrypting retrieved data for communication to the host (101). Thus, the data is cryptographically protected while being stored in the storage device (103) and protected while being transmitted from the storage device (103). The first key and the second key may be keys from two different pairs of public and private keys. For example, a first key pair is generated by the crypto engine (421) for the namespace (e.g., 221, 223); the private key of the first key pair can be used as the first key for decryption; a second key pair may be generated by a separate device (e.g., the host (101)); and the public key of the second key pair is received in the crypto engine (421) for the encryption of the data to be transmitted from the storage device (103).

When the crypto engine (421) performs both the encryption of data for storage in the non-volatile storage media (109) and the decryption of the data retrieved from the non-volatile storage media (109), a symmetric encryption method can be used with one crypto key.

Figure 23:
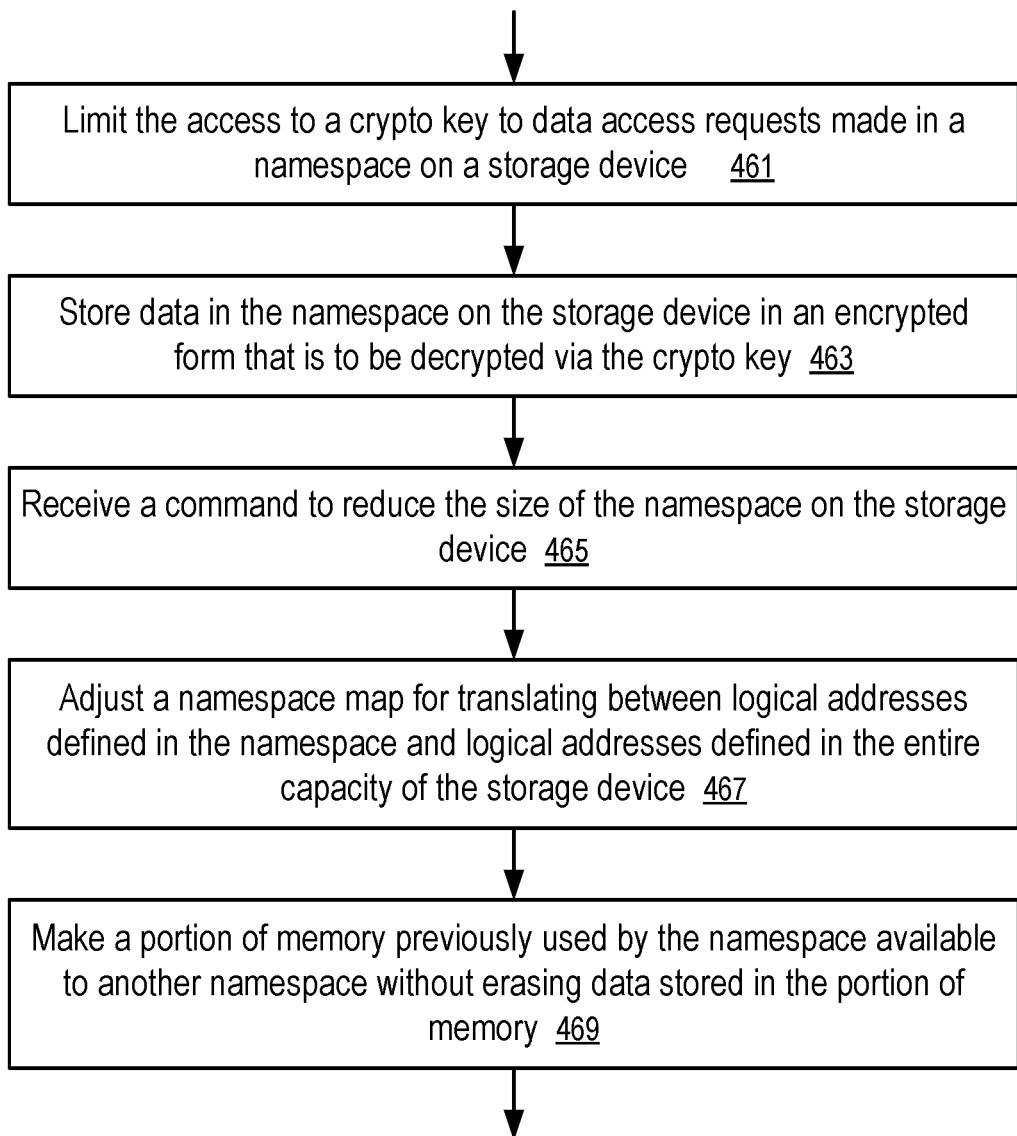
FIG. 23 shows a method to free a portion of a storage device previously used by a reduced namespace.

FIG. 23 shows a method to free a reduced portion of a storage device previously used by a namespace. For example, the method of FIG. 23 can be implemented in the storage device (103) illustrated in FIG. 1 using a crypto structure illustrated in FIG. 21, where the size of a namespace is encrypted according to a method of FIG. 22 and reduced in a way illustrated in FIGS. 13-16.

The method of FIG. 23 includes: limiting (461) the access to a crypto key to data access requests made in a namespace (e.g., 221, 224) on a storage device (103); storing (463) data in the namespace (e.g., 221, 224) on the storage device (103) in an encrypted form that is to be decrypted via the crypto key; receiving (465) a command (265) to reduce the size of the namespace (e.g., 221, 224) on the storage device (103); adjusting (467) a namespace map (e.g., 441, . . . 443) for translating between logical addresses defined in the namespace (e.g., 221, 224) and logical addresses defined in the entire capacity (220) of the storage device (103); and making (469) a portion of memory previously used by the namespace (e.g., 221, 224) available to another namespace without erasing data stored in the portion of memory.

For example, when a namespace (221) illustrated in FIG. 13 is reduced (365) to remove the block (361) of logical addresses defined in the namespace (221), the L-block (239) and its associated physical memory are freed from the namespace (221) and made available for allocation to another namespace. For example, another namespace may increase in size to use the logical addresses in the L-block (239) defined on the capacity (220) and their associated physical memory in the non-volatile storage media (109); alternatively, a new namespace may be allocated to use the logical addresses in the L-block (239) defined on the capacity (220) and the corresponding physical memory. Since the crypto key of the namespace (221) is not available to the namespace that subsequently uses the L-block (239) and the associated physical memory in the non-volatile storage media (109), the data content previously stored via the namespace (221) cannot be decrypted in data access requests made in the namespace that subsequently uses the L-block (239) and the associated physical memory. Therefore, it is not necessary to erase the data content from the physical memory used by the L-block before freeing it and making it available to another namespace. Skipping the data erasure operation speeds up the completion of the command (265) to reduce (365) the size of the namespace (221), without compromising data security.

Since the data content of the L-block (369) is not erased and the crypto key of the namespace (221) is not destroyed, the data content of the L-block (369) can be recovered by reallocating the L-block (369) back to the namespace (221). Thus, the operation of reducing (365) the size of the namespace (221) becomes reversible (e.g., before another namespace writes data using the logical addresses in the L-block (369)).

Similarly, a partial L-block (369) can be freed from a namespace (221) illustrated in FIG. 14 to reduce (365) the size of the namespace (221) without a need to perform a physical or cryptographic data erasure operation on the portion of non-volatile memory identified by the logical addresses in the partial L-block (369).

Similarly, a partial L-block (377) and a portion of an L-block (237) can be freed from a namespace (221) illustrated in FIG. 15 or 16 to reduce (365) the size of the namespace (221) without a need to perform a physical or cryptographic data erasure on the freed portion of non-volatile storage media (109).

Figure 24:
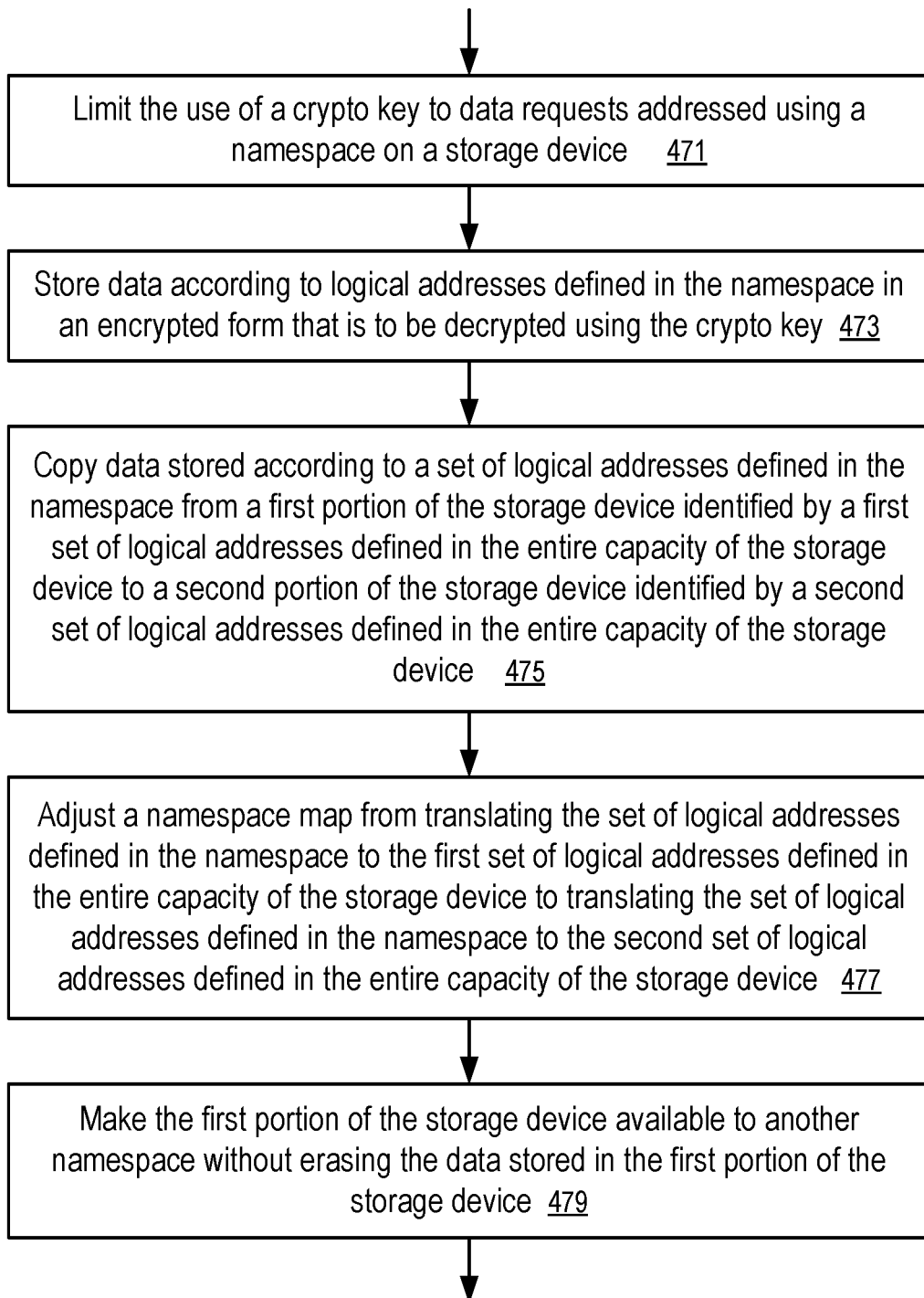
FIG. 24 shows a method to free a redundant portion of a storage device previously used by a namespace.

FIG. 24 shows a method to free a redundant portion of a storage device previously used by a namespace. For example, the method of FIG. 24 can be implemented in the storage device (103) illustrated in FIG. 1 using a crypto structure illustrated in FIG. 21 for a namespace encrypted using a method of FIG. 22.

The method of FIG. 24 includes: limiting (471) the use of a crypto key to data requests addressed using a namespace (221) on a storage device (103); storing (473) data according to logical addresses defined in the namespace (221) in an encrypted form that is to be decrypted using the crypto key; copying (475) data stored according to a set of logical addresses defined in the namespace (221) from a first portion of the storage device (103) identified by a first set of logical addresses defined in the entire capacity (220) of the storage device (103) to a second portion of the storage device (103) identified by a second set of logical addresses defined in the entire capacity (220) of the storage device (103); adjusting (477) a namespace map (e.g., 441, . . . , 443) from translating the set of logical addresses defined in the namespace (221) to the first set of logical addresses defined in the entire capacity (220) of the storage device (103) to translating the set of logical addresses defined in the namespace (221) to the second set of logical addresses defined in the entire capacity (220) of the storage device (103); and making (479) the first portion of the storage device (103) available to another namespace without erasing the data stored in the first portion of the storage device (103).

For example, before the remapping (379) of the namespace (221) in FIG. 17, the logical addresses in the block (371) defined in the namespace (371) are mapped to the logical addresses in the partial L-block (373) defined in the capacity (220) of the storage device (103). After the remapping (379) of the namespace (221) in FIG. 17, the logical addresses in the block (371) defined in the namespace (371) are mapped to the logical addresses in the different partial L-block (378) defined in the capacity (220) of the storage device (103). To facilitate remapping (379) in some implementations, data stored in a physical portion of the non-volatile storage media (109) identified by the logical addresses in the partial L-block (373) is copied or mirrored to a physical portion of the non-volatile storage media (109) identified by the logical addresses in the different partial L-block (377). After the remapping (379) of the namespace (221) in FIG. 17, the partial L-block (373) and its associated physical portion of the non-volatile storage media (109) can be freed from the namespace (221) and made available to another existing or new namespace.

Since the crypto key of the namespace (221) is not available to the existing or new namespace that subsequently uses the portion of the non-volatile storage media (109) identified by the partial L-block (373), the data content previously stored according to the partial L-block (373) for the logical addresses in the block (371) defined the namespace (221) cannot be decrypted in data access requests made in the existing or new namespace that subsequently uses the partial L-block (373). Therefore, it is not necessary to erase the data content from the physical memory identified by the partial L-block (373) before freeing it and making it available to the existing or new namespace, without compromising data security.

In general, the crypto engine (421) of the storage device (103) may be optionally configured, at the time of the creation of a particular namespace (221), to use one or more crypto keys exclusively for the particular namespace (221) in the context of a logical address defined in the namespace (221), where the logical address defined in the namespace (221) is mapped to a logical address defined, in a way independent of namespace, in the entire capacity (220) of the storage device (103) for translation, in a way independent of namespace, to a physical address in the non-volatile storage media (109).

In writing operations where destinations are specified using logical addresses defined in the namespace (221) to store data, the data may be considered as being written into the namespace (221) that logically identifies a portion of the nonvolatile storage media (109) of the storage device (103).

In reading operations where sources are specified using logical addresses defined in the namespace (221) to retrieve data, the data may be considered as being read from the namespace (221) that logically represents the portion of the nonvolatile storage media (109) of the storage device (103).

A namespace-dependent crypto key can be used by the crypto engine (421) for encryption in writing data into the namespace (221) in an encrypted form that is to be decrypted in a namespace dependent way, and/or for decryption in reading data from the namespace (221). A set of registers can be used to hardwire the association between namespaces and their crypto key(s) to improve data security.

The crypto engine (421) may be optionally configured to perform encryption during writing data in the namespace (221) and decryption during reading data from the namespace (221), using a symmetric encryption or non-symmetric encryption.

The crypto engine (421) may be optionally configured to perform encryption for the namespace (221) without performing decryption for the namespace (221). For example, a host (101) having a private key may provide a public key to the crypto engine (421) for encryption. Thus, the data retrieved to the host (101) from the namespace (221) can be decrypted only when the host (101) is in possession of the private key. The data stored in the namespace (221) is cryptographically secure, even when the storage device (103) can be dynamically connected to different hosts. Such an arrangement allows the host (101) to perform a cryptographic erasure of the data content in the namespace (221), by destroying the private key, even after the host (101) losses the connection to the storage device (103).

In some instances, the crypto engine (421) is configured to generate the key pair, including the public key and the private key, during the creation of the namespace. Thus, the private key can be provided to the host (101) for decryption and not stored in the storage device. Alternatively, the crypto engine (421) receives the public key without ever obtaining the private key.

The crypto engine (421) may be optionally configured to perform decryption for the namespace (221) without performing encryption for the namespace (221). For example, one or more hosts (101) having a public key may encrypt data using the public key for storing the data in the namespace (221) without the storage device (103) performing encryption. The crypto engine (421) stores the encrypted data in the namespace (221) that can be decrypted via the private key that is available only on the storage device (103). The private key can be accessed for decryption only when the access to the namespace (221) for data retrieval is authenticated and only used for data retrieval through the namespace (221). Preferably, the private key is generated by the crypto engine (421) and is not usable outside of the crypto engine (421). Thus, the storage device (103) can perform a cryptographic erasure of the data content of the namespace (221) by destroying the private key within the storage device (101).

Further, the above discussed different options may be combined as multiple layers of encryption operations for enhanced security.

In at least one embodiment disclosed herein, storage resources allocated to different accounts are separated by and/or organized via namespaces. Different storage resources are allocated under different namespaces for usage under different accounts. Separation of storage resources used by different accounts according to namespace allows user data in different accounts to be separately encrypted and thus protected cryptographically, using different encryption keys registered with the namespaces in storage devices, such as in a way illustrated in FIGS. 21 to 24.

Access to computation resources, including data storage resources, is typically restricted via accounts. When a user is authenticated to have the privilege to access an account, the user is provided with the access to the computation resources available in the account.

When an account is created, the storage resources allocated to the account can be organized as a namespace allocated on a storage device via a namespace map, such as those as illustrated in FIGS. 2 to 20. The storage resources available in the account are typically limited by a quota specified for the account. The quota of the account can be implemented as the created size of the namespace that is assigned to the account.

Initially, the namespace created according to the quota of the account can be partially allocated on the storage device using a namespace map such that the size of the namespace allocated on the storage device is smaller than the quota. The namespace is thinly provisioned on the storage device. The allocated size of the namespace can gradually increase over a period of time, through the adjustment of its namespace map using techniques illustrated in FIGS. 18 to 19, to accommodate the increasing demand of storage resources in the account. Further, the change of the quota size of the account can be implemented through the adjustment of its namespace map using techniques illustrated in FIGS. 13 to 17.

Figure 25:
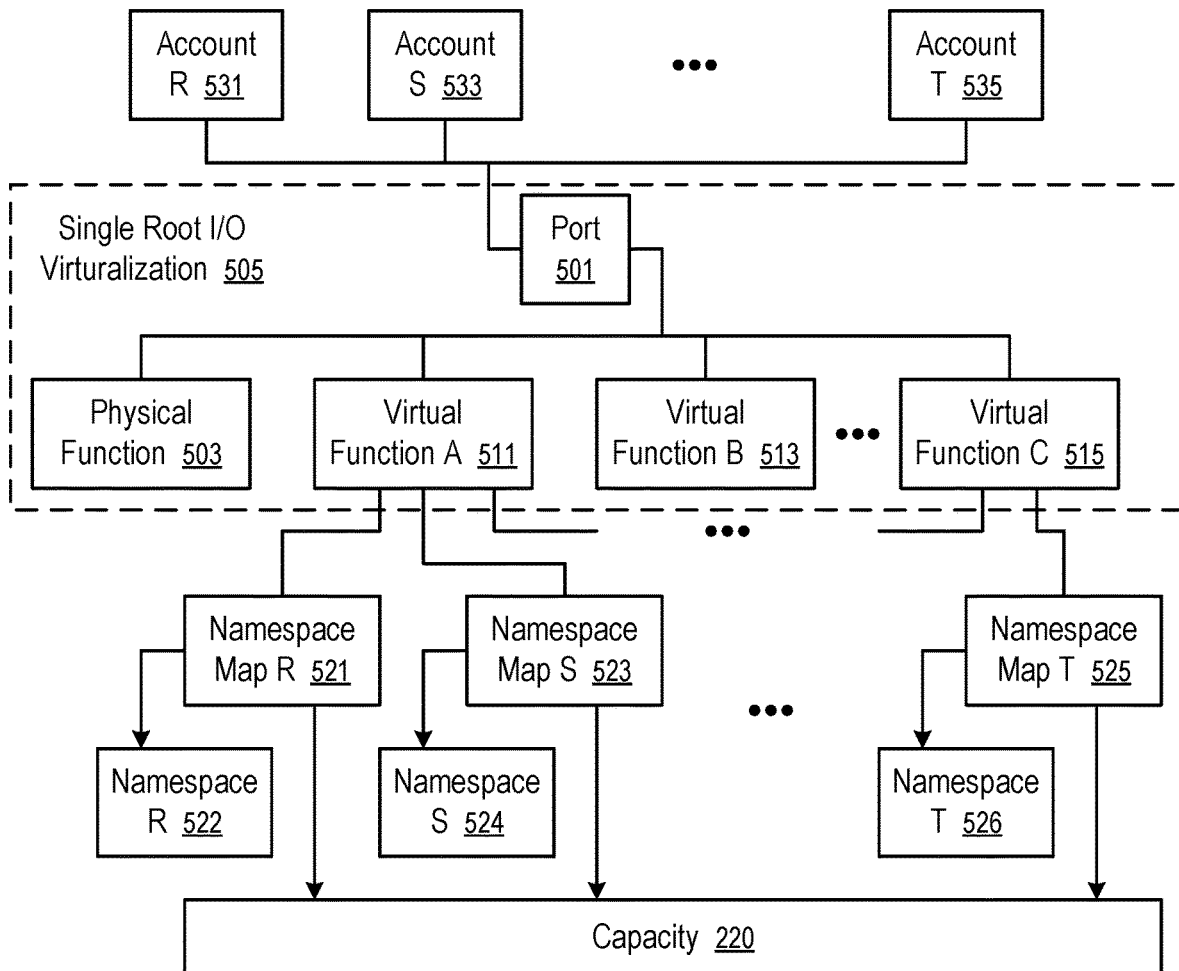
FIG. 25 shows a system to use namespaces to manage storage resources allocated to accounts.

FIG. 25 shows a system to use namespaces to manage storage resources allocated to accounts. For example, the system of FIG. 25 can be implemented in a host (101) having a storage device (103) illustrated in FIG. 1 with namespace map techniques illustrated in FIGS. 2 to 24.

In FIG. 25, the system has a plurality of accounts (531, 533, . . . , 535). The storage resources allocated to the accounts (531, 533, . . . , 535) are identified by a plurality of namespaces (522, 524, . . . , 525).

The namespaces (522, 524, . . . , 525) are allocated on the logical storage capacity (220) of a storage device (103), using a plurality of namespace maps (521, 523, . . . , 525). Each of the namespace maps (521, 523, . . . , 525) defines the mapping between the logical addresses in the respective namespace (e.g., 522, 524, . . . , or 525) and the corresponding logical storage addresses in the capacity (220). The mapping can be defined and performed using the L-blocks illustrated in FIGS. 2 to 24.

For example, a logical address defined in the namespace (522) can be converted using the namespace map (521) into a corresponding logical address (257) in the capacity (220), which can be further translated into a physical address (259), using a local manager (229) illustrated in FIG. 5, to access a memory unit in the non-volatile storage media (109) in the storage device (103). Using the techniques illustrated in FIGS. 2 to 24, contiguous logical addresses in the namespace (522) do not have to be mapped to contiguous logical addresses in the capacity (220).

In FIG. 25, the storage resources accessible in an account (e.g., 531) are identified by a namespace (e.g., 521) of the account (e.g., 531). To store or retrieve a data element in the account (531) in a non-volatile memory, an instruction to the storage device (103) uses a logical address defined in the namespace (522) of the account (531) to specific the logical storage location in the namespace (522). The storage device (103) converts the logical address defined in the namespace (522) into a logical address (257) in the capacity (220) using the namespace map (521), and then converts the logical address (257) in the capacity (220) into a physical address (259) of a memory unit in the non-volatile storage media (109) of the storage device (103).

In one implementation, an account (e.g., 531, 533, . . . , or 535) is limited to access only one namespace (e.g., 522, 524, . . . 526). Thus, the identification of an account (e.g., 531) uniquely identifies a namespace (e.g., 522) in which user data in the account (e.g., 531) is stored. For example, user data in the account (531) is limited to be stored in the namespace (522) defined by the namespace map (521) and is not stored in other namespaces (e.g., 524, . . . , 526) defined by respective namespace maps (e.g., 523, . . . , 525); and user data in the account (533) is limited to be stored in the namespace (524) defined by the namespace map (523) and is not stored in other namespaces (e.g., 526, 522, . . . ) namespaces defined by respective namespace maps (e.g., 525, 521, . . . ).

For simplicity in storage management in accounts, each account (e.g., 531, 533, . . . , or 535) is configured to use no more than one namespace (e.g., 522, 524, . . . , or 526). Since the logical addresses used in an account (e.g., 531) are implicitly defined in a namespace (e.g., 522) that is associated with the account (e.g., 531), the logical addresses defined in the namespace (e.g., 522) can be used as the logical addresses in the account (e.g., 531). Thus, storage address processing in the account (e.g., 531) can be simplified for improved efficiency.

Optionally, more than one namespace can be assigned to a single account (e.g., 531) to facilitate additional flexibility in storage management within an account (e.g., 531)

For example, when two or more accounts (e.g., 531 and 535) are designed to share access to a same set of data, a namespace (e.g., 524) defined by a namespace map (e.g., 523) can be used to identify such a shared storage resource for the two or more accounts (e.g., 531 and 535).

In FIG. 25, single root I/O virtualization (505) is used to facilitate the communication between the host (101) and the storage device (103) according to a predetermined standard (e.g., a PCI-SIG Single Root I/O Virtualization and Sharing Specification). With single root I/O virtualization (505), the physical function (503) implemented in the storage device (103) is accessible via a plurality of virtual functions (511, 513, . . . , 515). Each of the virtual functions (511, 513, . . . , 515) presents the storage device (103) as a different virtual storage device having functions similar to the physical function (503). Thus, the host (101) may treat the storage device (103) accessed through a single port (501) (e.g., a PCI Express port) as multiple virtual devices that can be used concurrently in multiple virtual machines running in the host (101). Each virtual machine can be configured with one or more of the virtual devices that physically implemented via the same physical function (503) accessed via the same port (501).

For example, the physical function (503) is implemented by the controller (107) in the storage device (103). Implementing single root I/O virtualization (505) in the host interface (105) allows the host (101) to see the storage device (103) to have multiple virtual controllers that may be used in a way as if they were independent controllers virtually coupled to the host interface (105) in the same way as the controller (107) coupled to the host interface (105).

In FIG. 25, different groups of namespaces (522, 524, . . . , 526) are attached to different virtual functions (e.g., 511, 513, . . . , 515). For example, namespaces (522, 524, . . . ) defined by namespace maps (521, 523, . . . ) are attached to the virtual function (511). The storage device (103) is configured as a virtual function (511) in a virtual machine running in the host (101), separately from the storage device (103) being configured as other virtual functions (513, . . . , 515) in other virtual machines running in the host (101). When the virtual machine running in the host (101) accesses the storage device (103) via the virtual function (511), the namespaces (522, 524, . . . ) attached to the virtual function (511) are accessible in the virtual machine; and the other namespaces (e.g., 526) not attached to the virtual function (511) are not accessible via the virtual function (511). The namespace maps (521, 523, . . . ) are used by the virtual function (511) to facilitate data access in the namespaces (522, 524, . . . ) that in a portion of the storage device (103) virtually presented by the virtual function (511), as if it were a storage device (103) different from the portions of the storage device (103) represented by other virtual functions (e.g., 513, . . . , 515).

In some instances, a namespace may be attached to multiple virtual functions and/or physical functions coupled to one port for multi-path I/O. In further instances, a namespace may be attached to multiple virtual functions and/or physical functions coupled to multiple ports for namespace sharing.

Optionally, the namespaces (522, 524, . . . , 526) defined by the namespace maps (521, 523, . . . , 525) can be allocated under the storage device (103) without using the single root I/O virtualization (505).

When the capacity (220) of the storage device (103) is insufficient to meet the demand of the accounts (531, 533, . . . , 535), one or more additional storage devices can be added to the system. After connecting the additional storage devices to the host (101), one or more of the namespaces (e.g., 525) can be moved from the storage device (103) to the added storage devices.

Figure 26:
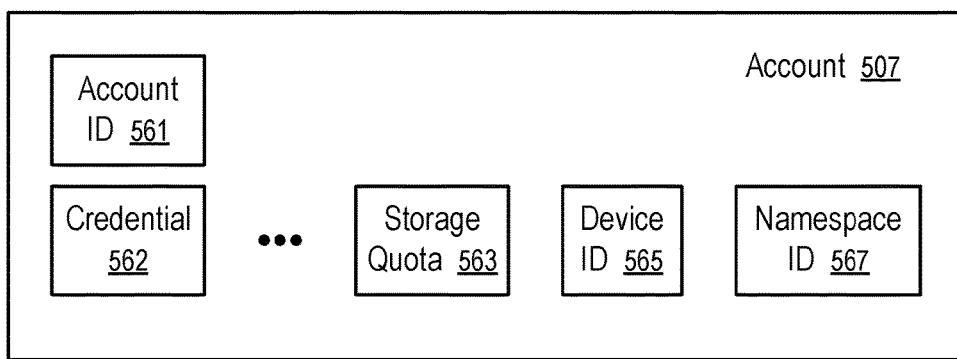
FIG. 26 shows an example of an account.

FIG. 26 shows an example of an account (507). For example, the account (507) can be used to implement any of the accounts (531, 533, . . . , 535) illustrated in FIG. 25.

The account (507) of FIG. 26 includes an account ID (561) that uniquely identifies the account (507) among a set of accounts (e.g., 531, 533, . . . , 535) in the host (101). The account (507) has a set of attributes that configure the operations permissible in the account (507), such as credential (562), storage quota (563), device ID (565), namespace ID (567), etc.

The credential (562) of the account (507) is used to authenticate a user of the account (507). For example, the credential (562) may be implemented as a password or other data items (e.g., fingerprint, voice fingerprint, facial features, a private key) that an authorized user has but that is normally unavailable to others. A user authenticated via the credential (562) is allowed to access the resources in the account (507), including the storage resources allocated to the account (507).

The storage quota (563) identifies a limit of the amount of storage resources the account (507) is allowed to use. When the account (507) is configured with a single namespace (e.g., 522), the storage quota (563) can be specifies as the size of the namespace (e.g., 522) created on a storage device (103) for the account (507). When the account (507) is configured with multiple namespaces (e.g., 522 and 524), the storage quota (563) may limit the sum of the sizes of the namespaces (e.g., 522 and 524) attached to the account (507).

The device ID (565) identifies a storage device (103) connected to the host (101) where the namespace(s) of the account (507) reside(s).

For example, when single root I/O virtualization (505), as illustrated in FIG. 25, is used to organize access to the namespaces in the storage device (103), the device ID (565) identifies a virtual function (e.g., 511) to which the namespace(s) (e.g., 522) of the account (507) is/are attached.

In some instances, the host (101) maintains a look up table that identifies the device IDs (e.g., 565) of namespaces (e.g., 522, 524, . . . , 526) used in the host (101). In such a configuration, it is not necessary to store the device ID (565) as part of the account (507).

The namespace ID (567) uniquely identifies a namespace (e.g., 522) in the namespaces (522, 524, . . . 526) used in the host (101) and/or on the device identified by the device ID (565). A data storage location for the account (507) can be identified as a logical address defined in the namespace (e.g., 522) identified by the namespace ID (567). For example, a combination of a logical address and the namespace ID address to the device identified by the device ID (565) can uniquely identify a data storage location for the account (507) that is physically implemented in the storage device (103).

When the device ID (565) can be looked up from the namespace ID (567) and the account (507) is assigned a single namespace (e.g., 522) identified by the namespace ID (567), an application running in the account (507) does not have to explicitly identify the device ID (565) and the namespace ID (567), which allows the application to be used without modification even after the storage resource of the account is relocated to a separate device and/or reassigned a different namespace (e.g., 524).

The data items (561, . . . , 567) illustrated in FIG. 26 are meta data of the account (507), which are typically stored as a part of the operating system of the host (101) and stored separate from the user data of the account (507). For example, the meta data of accounts (531, 533, . . . , 535) can be store in a dedicated namespace, separate from the namespaces (e.g., 522, 524, . . . , 526) used for the storage of the user data of the accounts (531, 533, . . . , 535); and the user data in the account (507) is stored in the namespace (e.g., 522) identified by the namespace ID (567).

Figure 27:
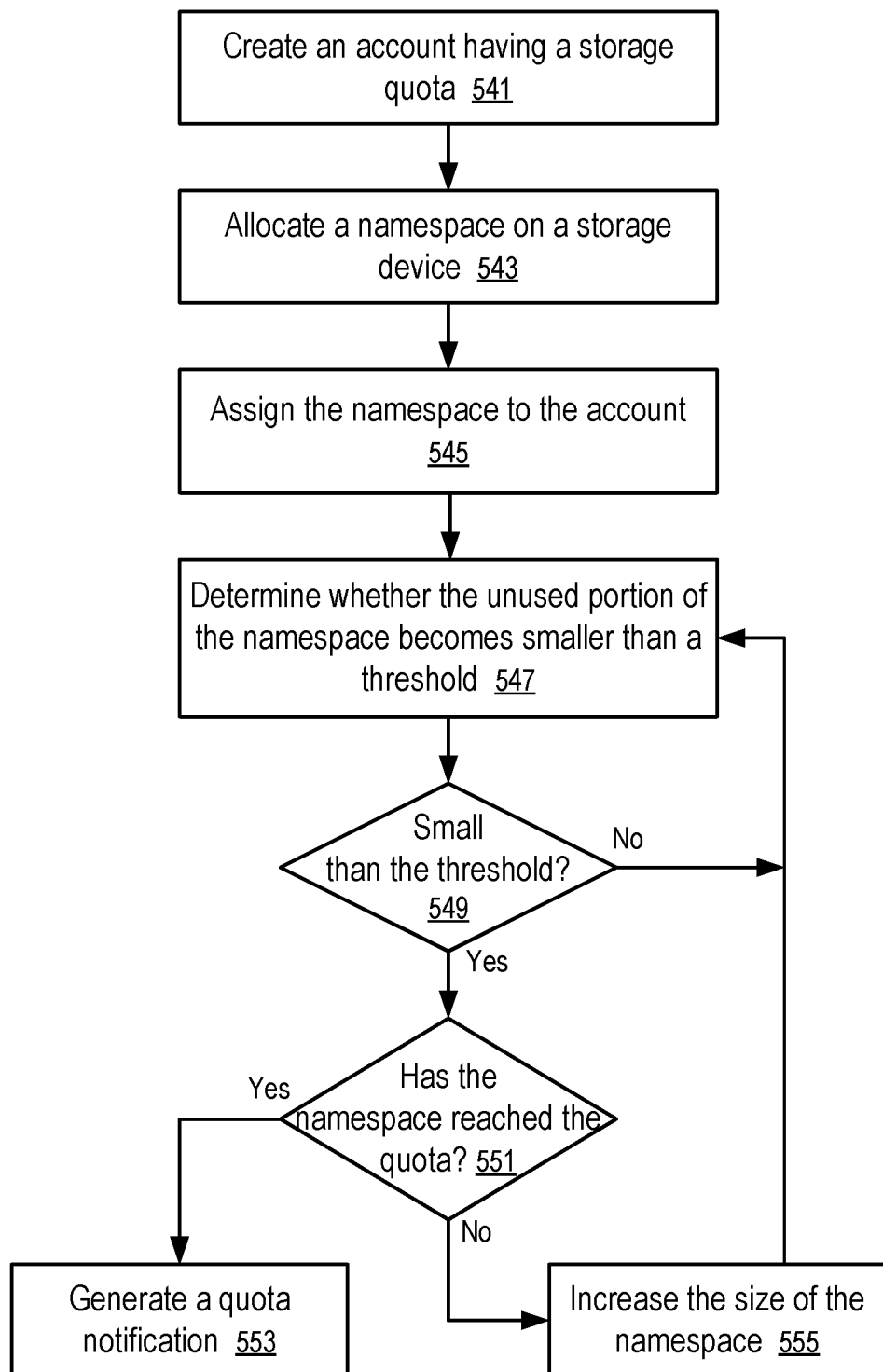
FIG. 27 shows a method to dynamically allocate storage resources to accounts based on the usage of the resources.

FIG. 27 shows a method to dynamically allocate storage resources to accounts based on the usage of the resources. For example, the method of FIG. 27 can be implemented on a system illustrated in FIG. 25 with account meta data illustrated in FIG. 26.

The method of FIG. 27 includes: creating (541) an account (e.g., 531) having a storage quota (e.g., 563); allocating (543) a namespace (e.g., 522) on a storage device (103); assigning (545) the namespace (e.g., 522) to the account (e.g., 531); and determining (547) whether the unused portion of the namespace (e.g., 522) becomes smaller than a threshold.

If (549) it is determined that the unused portion of the namespace (e.g., 522) is small than the threshold and it is determined (551) that the namespace (e.g., 522) has not yet reached the quota (e.g., 563), the method of FIG. 27 further includes increasing (555) the size of the namespace (e.g., 522) by adjusting its namespace map (e.g., 521).

If (549) it is determined that the unused portion of the namespace (e.g., 522) is small than the threshold and it is determined (551) that the namespace (e.g., 522) has reached the quota (e.g., 563), the method of FIG. 27 further includes generating (553) a quota notification to alert a user of the account (e.g., 531).

For example, the namespace map (e.g., 521) can be implemented via mapping blocks of logical addresses from the namespace (e.g., 522) to the capacity (220) of the storage device (103) in a way as illustrated in FIG. 2, 3, or 11.

For example, the namespace map (e.g., 521) may include a list of the identifications of L-blocks in the capacity (220) to define the logical address mapping, as illustrated in FIG. 4 and/or a partial block identifier (147) illustrated in FIG. 8.

For example, the conversion of a logical address in the namespace (e.g., 522) to a physical address (259) in the non-volatile storage media (109) can be performed in a way illustrated in FIG. 5.

For example, the creation of the namespace (e.g., 522) can be performed using the method of FIG. 6 or 12.

For example, the namespace (e.g., 522) can be expanded (363) using the techniques of FIG. 13, 14, 15, or 16.

For example, the namespace (e.g., 522) can be remapped (379) using the technique of FIG. 17 (e.g., to improve performance).

For example, the namespace (e.g., 522) can be initially created with a size (131) equal to the quota (e.g., 563) but partially mapped to the capacity (220) in a way as illustrated in FIG. 18. When the unused portion of the mapped part of the namespace (e.g., 522) is determined (547) to be smaller (549) than the threshold, an additional portion of the namespace (e.g., 522) is mapped (e.g., on demand and/or just in time for usage) to the capacity (220) in a way as illustrated in FIG. 19.

For example, the size adjustment of the namespace (e.g., 522) can be implemented using the method of FIG. 20.

Optionally, the namespace (e.g., 522) can be encrypted using the techniques of FIG. 21 such that the adjustments of the namespace can be performed to make storage resources, initially used by one account (e.g., 533), available for used in another account (e.g., 531), without having to perform data erasure on the storage resources.

Figure 28:
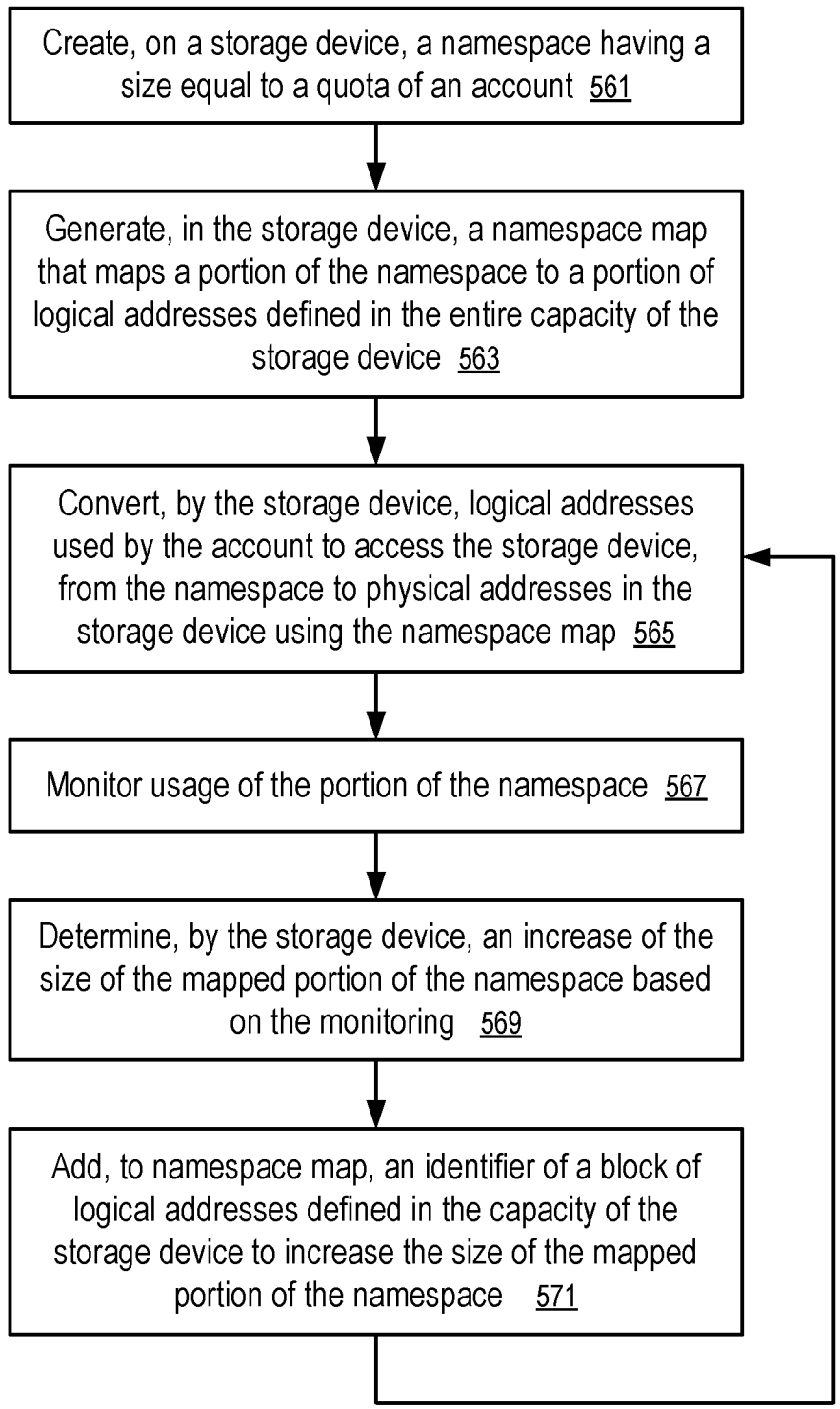
FIG. 28 shows a method to manage storage resources of an account.

FIG. 28 shows a method to manage storage resources of an account. For example, the method of FIG. 28 can be implemented on a system illustrated in FIG. 25 with account meta data illustrated in FIG. 26 to implement the method of FIG. 27.

The method of FIG. 28 includes: creating (561), on a storage device (103), a namespace (521 or 221) having a size (131) equal to a quota (563) of an account (531); generating (563), in the storage device (103), a namespace map (521) that maps a portion (241 and 243) of the namespace (521 or 221) to a portion (233 and 237) of logical addresses defined in the entire capacity (220) of the storage device (103); converting (565), by the storage device (103), logical addresses used by the account (531) to access the storage device (103), from the namespace (521 or 221) to physical addresses (259) in the storage device (103) using the namespace map (521); monitoring (567) usage of the portion of the namespace (241 and 243); determining (569), by the storage device (103), an increase of the size of the mapped portion of the namespace (521 or 221) based on the monitoring (567); and adding (571), to namespace map (521), an identifier of a block (383) of logical addresses defined in the capacity (220) of the storage device (103) to increase the size of the mapped portion of the namespace (521).

For example, a computer system having a host (101) and a storage device (103) illustrated in FIG. 1 can be configured to have a plurality of accounts (531, 533, . . . , 535). The meta data of the accounts (531, 533, . . . , 535), such as credential (562) for user authentication, storage quota (563) for the identification of resource limits, can be stored in the storage device (103), in the host (101), or another device similar to the storage device (103).

Each account (e.g., 531) in the computer system is configured with a namespace identifier (e.g., 567) that identifies the allocation of a portion of the non-volatile storage media (109) of the storage device (103) to the corresponding account (e.g., 531). In some instances, the account ID (561) of the account (e.g., 531) is used as the namespace ID (567) for simplicity, such that the account ID (561) and the namespace ID (567) are the same.

Within the account (e.g., 531) the access to the storage device (103) is made using the logical addresses defined in the namespace (e.g., 522) identified by the namespace ID (e.g., 567).

The namespace map (e.g., 521) of the namespace (e.g., 522) is generated (563) for the account (e.g., 531) and stored in the storage device (103) for converting the logical addresses used in the account (e.g., 531) from the namespace (e.g., 522) to the capacity (220) of the storage device (103). The logical addresses in the capacity (220) of the storage device (103) are further converted into physical addresses (259) of the physical memory units in the non-volatile storage media (109) of the storage device (103).

In some implementations, the entire storage resources allocated for user data in the account are identified by the namespace ID (e.g., 567). When multiple storage devices (e.g., 511, 513, . . . , 515) are recognized in the host (101), some of which may be presented via single root I/O virtualization (505) implemented in the host interface (105) and physically in the same storage device (e.g., 103), a look up table can be used in the host (101) to determine the identifier (e.g., 565) of the device in which the namespace (e.g., 522) is attached.

Alternatively, an account (e.g., 535) may have storage resources allocated in multiple namespaces (e.g., 526, . . . ). Different namespaces (e.g., 526, . . . ) of the account (e.g., 535) may be used for different purposes. For example, one of the namespace (e.g., 526) may be used to store data for sharing with another account (e.g., 533); and the sharing can be implemented via attaching the shared namespace (e.g., 526) to the accounts (e.g., 533, 535).

Initially, the actual data storage demand of the account (e.g., 531) is low. Thus, the data storage (103) may only partially map the namespace (e.g., 522) by using a namespace map (e.g., 521) that maps only a portion of the logical address of the namespace (522) onto the capacity (220).

When the storage device (103) determines (569) that the data storage need of the account (e.g., 531) is increased and the mapped portion of the namespace (522) is insufficient (e.g., the unused portion of the mapped portion of the namespace (522) is smaller than a threshold), the storage device (103) automatically increases the mapped portion of the namespace (522) by adjusting the namespace map (521).

For example, the controller (107) of the storage device (103) as configured by the firmware increases the size of the mapped portion of the namespace (522) by adding to the namespace map (521) an identifier of a block of logical addresses that are defined in the capacity (220) of the storage device (103).

In some instances, when the data storage need of the account (e.g., 531) decreases, the controller (107) of the storage device (103) may automatically reduce the size of the mapped portion of the namespace (522) by removing from the namespace map (521) an identifier of a block of logical addresses that are defined in the capacity (220) of the storage device (103).

Similarly, when the quota (563) of the account (e.g., 531) is changed, the size of the namespace (522) can be adjusted accordingly via adjustments of the namespace map (521). For example, to increase the size of the namespace (522), one or more identifiers of blocks of logical addresses defined in the capacity (220) can be added to the namespace map (521); and to reduce the size of the namespace (522), one or more identifiers of blocks of logical addresses defined in the capacity (22) can be removed from the namespace map (521). Preferably, the blocks of logical addresses have a predetermined block size (133) that is a power of two.

Optionally, the storage device (103) has a register (e.g., 431, . . . , or 433) that stores a crypto key (e.g., 441, . . . , or 443) of the namespace (e.g., 522) during data access performed in the namespace (e.g., 522) and/or in the account (e.g., 531).

In at least some embodiments, the host (101) and the storage device (103) communicate with each other via message queues. For example, a submission queue can be used by the host (101) to submit requests to the storage device (103); and a completion queue can be used by the host (101) to receive responses from the storage device (103). For example, a version of NVMe (e.g., Non-Volatile Memory Host Controller Interface Specification 1.2) specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage device (103), commands to write data into the storage device (103), commands to compare data in the storage device (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the controller (107) of the storage device (103) fetch the commands/requests from a submission queue according to the order in which the commands are placed in the submission queue. However, the NVMe allows the controller (107) to execute the fetched commands in any order.

In at least some embodiments disclosed herein, when there are multiple I/O submission queues for the storage device (103), the storage device (103) is configured to process different queues with the same priority and execute commands fetched from the different queues without queue-based preference.

For example, the storage device (103) may process all of the I/O submission queues configured for the storage device (103) according to a round robin scheme, where the storage device (103) executes one command from a queue, or up to a predetermined number of commands, and then processes the next queue according to a predetermined queue order.

For example, the storage device (103) may randomly select a queue to execute a command (or up to a predetermined number of commands) and then randomly select the next queue for execution of a command (or up to the same predetermined number of commands).

For example, the storage device (103) may randomly select a queue for the execution of a random number of commands and then randomly select the next queue for execution of a random number of commands.

For example, the storage device (103) may randomly select a queue for the execution of a set of related commands in the queue and then randomly select the next queue for execution of a set of related commands.

Since none of the I/O submission queues is provided with a priority higher than others (e.g., at least in a statistical sense over a period of time), the data access performance of the storage device (103) is substantially equally distributed among the I/O submission queues. Therefore, performance allocation to an account can be implemented via the adjustment of the number of input/output submission queues allocated for exclusive use by an account, as further discussed below.

Figure 29:
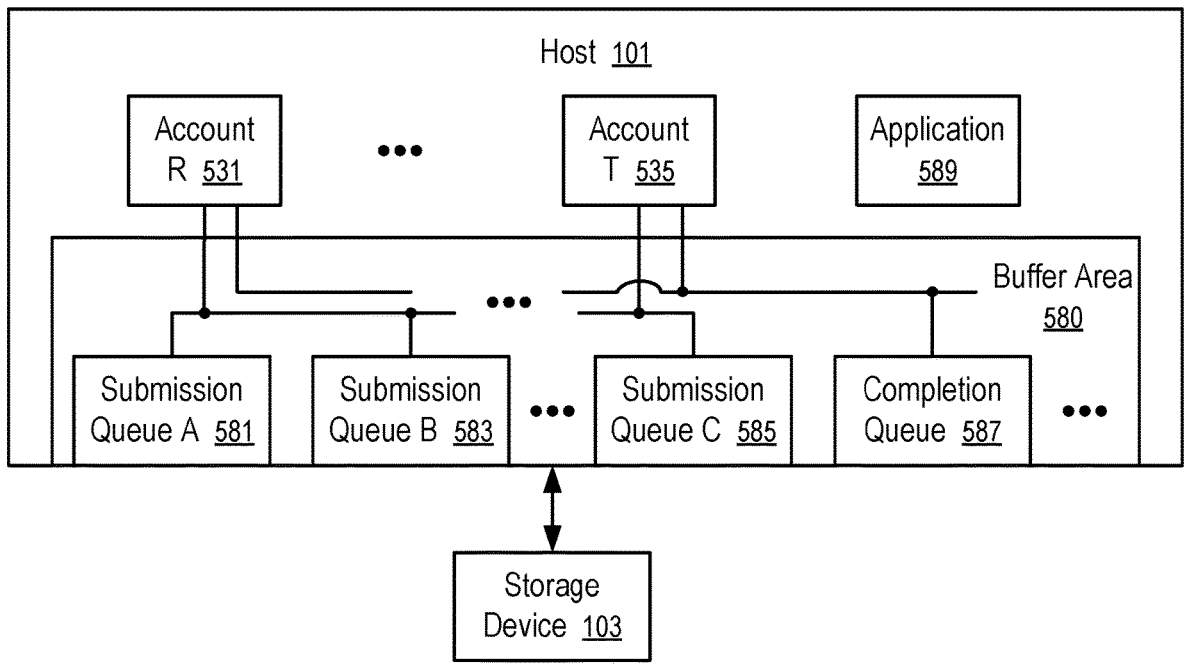
FIG. 29 shows a system having input/output queues arranged to manage data access performance.

FIG. 29 shows a system having input/output queues arranged to manage data access performance. For example, the system of FIG. 29 may use the storage device (103) illustrated in FIG. 1 with a plurality of accounts (531, . . . , 535) that are configured in a way similarly to the accounts (531, 533, . . . , 535) illustrated in FIG. 25.

The host (101) of FIG. 29 has a buffer area (580) in which I/O submission queues (e.g., 581, 583, . . . , 585) and I/O completion queues (e.g., 587, . . . ) are configured through communications between the host (101) and the storage device (103). For example, the communications can be performed in accordance with NVMe.

In FIG. 29, each account (e.g., 531) is assigned a set of submission queues (e.g., 581, 583, . . . ) that are not used by other accounts (e.g., 535).

For example, when the application (589) is executed in the account (531), the application (589) is configured to use the submission queues (e.g., 581, 583, . . . ) of the account (531) but not the other submission queues (e.g., 585); and when the application (589) is executed for another account (535), the application (589) is configured to use the submission queues (e.g., 585, . . . ) of the corresponding account (535) but not the other submission queues (e.g., 581, 583, . . . ). The application (589) may be executed concurrently in the account (531) and in the account (535) (e.g., via two running instances of the application (589) and/or in two virtual machines assigned to the accounts (531 and 535) respectively) where the submission queues (581, 583, . . . , 585) are concurrently deployed in the buffer area (580). The data access performance for the account (531) can be provisioned according to the number of submission queues (581, 583, . . . ) allocated to the account (531) for its exclusive use.

In some instances, each of the submission queues (581, 583, . . . , 585) has its separate completion queue (587) to reduce performance impact caused by sharing completion queues by multiple submission queues.

In other instances, a set of submission queues (e.g., 585, . . . ) allocated to an account (e.g., 535) share a completion queue (587) to reduce memory requirements in the buffer area (580). However, submission queues (e.g., 581 and 585) allocated to different accounts (e.g., 531 and 535) do not share a completion queue (587).

When different accounts (531, . . . , 535) do not share any submission queue and do not share any completion queue, data security of the accounts (531, . . . , 535) is improved.

Alternatively, the submission queues (e.g., 583, . . . , 585) allocated to different accounts (e.g., 531, . . . , 535) may share a completion queue (587).

Figure 30:
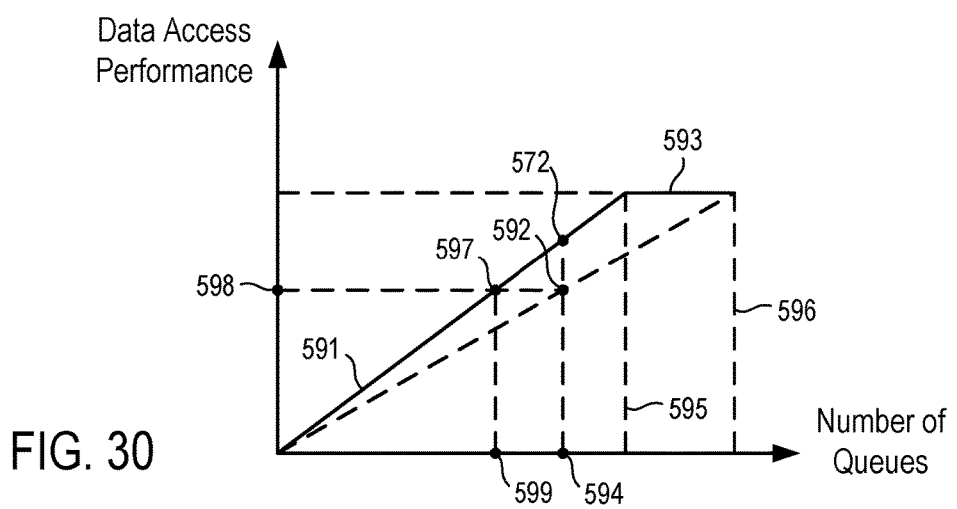
FIG. 30 illustrates a relation between the number of input/output queues and data access performance.

FIG. 30 illustrates a relation between the number of input/output queues and data access performance (e.g., in a system illustrated in FIG. 29).

FIG. 30 illustrates a performance curve (591, 593) of a storage device (103). When the total number of I/O submission queues (e.g., 581, 583, . . . , 585) configured in a host (101) for the storage device (103) is smaller than a threshold (595) and data access requests are evenly processed via the submission queues (581, 583, . . . , 585), the data access performance/speed achievable via the connection between the host (101) and the storage device (103) increases in a way that is substantially proportional to the number of I/O submission queues (581, 583, . . . , 585) configured in the host (101) for the storage device (103), as indicated by the segment (591) of the performance curve illustrated in FIG. 30. Thus, the achievable performance in accessing the storage device (103) using an account (e.g., 531) is substantially determined by the number of I/O submission queues allocated to the account (531), independent of the usage of the storage device (103) by other accounts.

For example, when the account (531) uses a particular number (599) of submission queues (581, 583, . . . ) and the total number of submission queues (581, 583, . . . , 585) configured for the storage device is less than the threshold (595), the achievable performance (598) of the account (531) in accessing the storage device (103) corresponds to the point (597) on the performance curve illustrated in FIG. 30. The performance (598) provisioned to the account (531) is substantially independent on the use of the storage device (103), when the total number of submission queues (581, 583, . . . 585, . . . ) used storage device (103) concurrently in period of time is no more than the threshold (595).

When multiple applications (e.g., 589) are executed in the account (e.g., 531) concurrently and the total number of submission queues (581, 583, . . . 585, . . . ) used concurrently by the storage device (103) during the execution of the applications is no more than the threshold (595), the allocation of the particular number (599) of I/O submission queues to the account (531) allows the data access performance (598) provisioned to the account (e.g., 531) to be divided among the applications (e.g., 589), which are concurrently running in the account (e.g., 531), according to the number of submission queues used by respective applications, without significant impact on the performance achievable in other accounts (e.g., 535) that are provided with other I/O submission queues (e.g., 585, . . . ). The account (e.g., 531) may divide the data access performance (598) for allocation to the multiple applications (e.g., 589) running in the account (531) by dividing, among the applications, the submission queues (581, 583, . . . ) that are allocated to the account (e.g., 531).

When the total number (e.g., 596) of I/O submission queues configured in the host (101) for the storage device (103) is greater than the threshold (595), the performance gain in data access over the connection between the host (101) and the storage device (103) as a result of increasing the use of submission queues may become saturated at a level (593) illustrated by the segment (593) of the performance curve of FIG. 30. Once the threshold (595) is reached, adding further I/O submission queues for the storage device (103) may not further boost the data access performance achievable over the connection between the host (101) and the storage device (103).

When the total number (596) of submission queues (581, 583, . . . 585, . . . ) used concurrently by the storage device (103) is more than the threshold (595), the saturated performance (593) can be evenly divided among the submission queues (581, 583, . . . 585, . . . ). In such a situation, when the account (531) uses the particular number (599) of submission queues (581, 583, . . . ), the performance of the account (531) in accessing the storage device (103) is generally not determined by the point (597) of the performance curve illustrated in FIG. 30. Instead, the performance of the account (531) in accessing the storage device (103) is a fraction of the saturated performance (593), proportional to the number (599) of the submission queues (581, 583, . . . ) allocated to the account (531) and inversely proportional to the total number (596) of submission queues (581, 583, . . . 585, . . . ) used concurrently by the storage device (103).

When the total number (596) of submission queues (581, 583, . . . 585, . . . ) used concurrently by the storage device (103) is limited by a predetermined count (596) that is no smaller than the threshold (595), the achievable performance (598) of the account (531) in accessing the storage device (103) is at least the saturated performance (593) multiplied by the number (594) of the submission queues (581, 583, . . . ) allocated to the account (531) and divided by the predetermined count (596).

Figure 31:
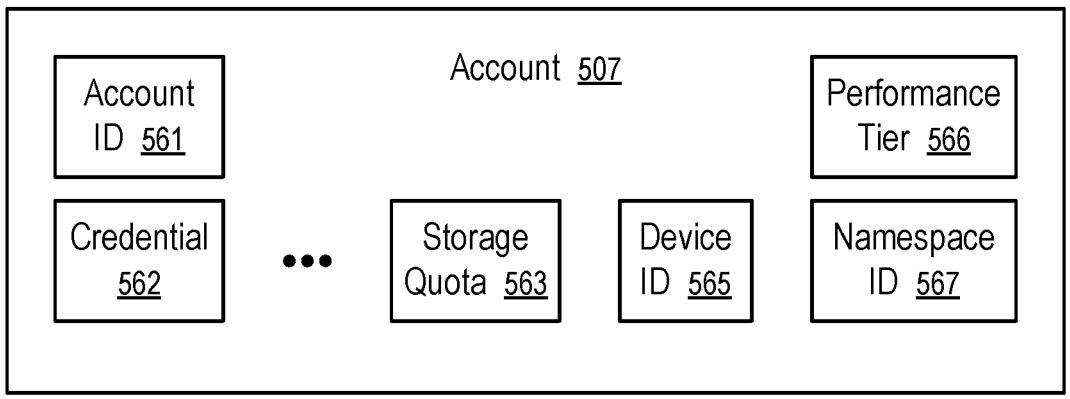
FIG. 31 shows another example of an account.

FIG. 31 shows another example of an account. For example, the account (507) illustrated in FIG. 31 can be implemented by adding a performance tier (566) in the account (507) illustrated in FIG. 26. For example, the account (507) illustrated in FIG. 31 can be an account (531 or 535) in the system of FIG. 29.

In FIG. 31, the performance tier (566) identifies a data access performance level (598) configured for the account (507). The data access performance level (598) is used to compute, according to the performance curve illustrated in FIG. 30, the number of submission queues (599 or 594) configured in the buffer area (580) of the host (101) for submitting I/O data requests to the storage device (103).

In one embodiment, the total number of submission queues concurrently configured for accessing the storage device (103) is limited to be no more than the threshold (595) for the saturated performance (593) of the storage device (103). When the performance tier (566) of the account (507) requires the performance level (598) illustrated in FIG. 30, the performance point (597) identifies the number (599) of submission queues to be configured for account (507).

In another embodiment, the total number of submission queues concurrently configured for accessing the storage device (103) is limited by the predetermined count (596) that no smaller than the threshold (595) for the saturated performance (593) of the storage device (103). When the performance tier (566) of the account (507) requires the performance level (598) illustrated in FIG. 30, the number (594) of submission queues to be configured for the account (507) is determined by the point (592) where the ratio between the number (594) and the predetermined count (596) is equal to the ratio between the performance level (598) of the account (507) and the saturated performance (593) of the storage device (103).

When the number (594) of submission queues is allocated to the account (507) according to the point (592) illustrated in FIG. 30, the achievable performance of the account (507) may increase up to the point (572) on the segment (591) of the performance curve of the storage device (103), when the concurrently used submission queues for the storage device (103) is reduced. As shown in FIG. 30, when the total number of submission queues concurrently used in accessing the storage device (103) is no more than the predetermined count (596), the data access performance provisioned to the account (507) is no worse than the point (592) and can be improved up to point (572).

Figure 32:
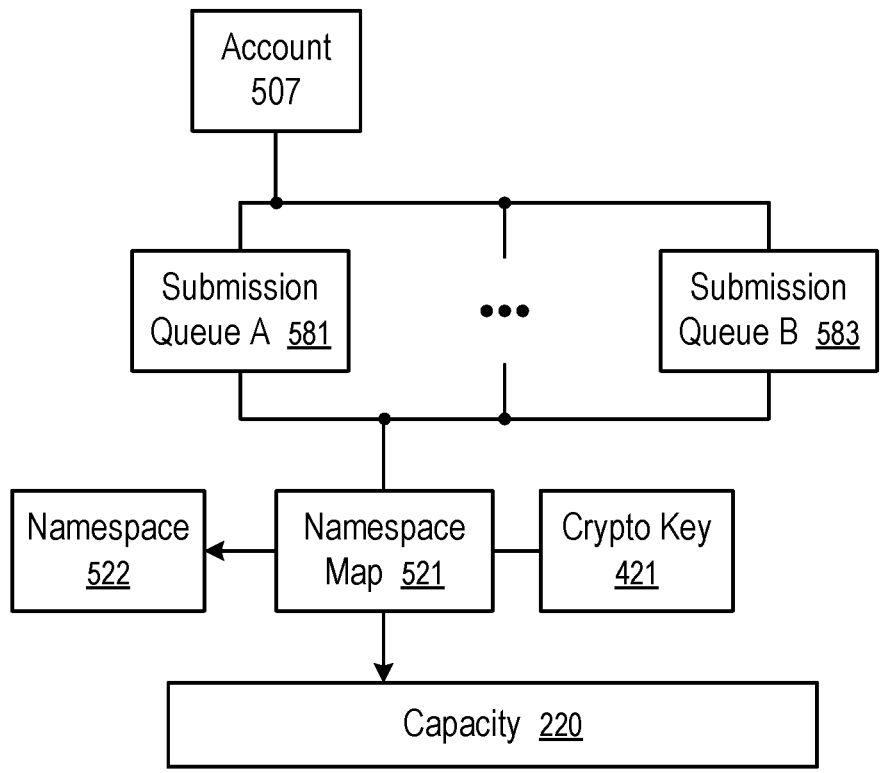
FIG. 32 illustrates a data access configuration of an account.

FIG. 32 illustrates a data access configuration of an account. For example, the data access configuration of FIG. 32 can be implemented in the system of FIG. 29 using the account (507) illustrated in FIG. 31. For example, the account (507) shown in FIGS. 31 and 32 may be the account (531) illustrated in the system of FIG. 29.

The account (507/531) is assigned (e.g., using the techniques illustrated in FIGS. 25 to 28) a namespace (522) identified by the namespace ID (567) and allocated on a portion of the entire capacity (220) of the storage device (103) that is identified by the device ID (565). A namespace map (521) is created on the storage device (103) to map the logical addresses defined in the namespace (522) to corresponding logical addresses defined in the capacity (220) of the storage device (103), e.g., using L-blocks and/or partial L-blocks discussed above in connection with FIGS. 3 to 20.

Optionally, a crypto key (421) is assigned to the namespace (522) (e.g., using the techniques illustrated in FIGS. 21 to 24) for exclusive use by the namespace (522).

The account (507/531) is assigned a number (599 or 594) of I/O submission queues (581, . . . , 583) according to its performance tier (566) such that the achievable performance of the account (507/531) in accessing the namespace (522) is no worse than the performance (598) promised by the performance tier (566).

The data access requests (e.g., read or write) to the namespace (522) allocated on the capacity (220) via the namespace map (521) are evenly and/or randomly distributed to the submission queues (581, . . . , 583) of the account (507/531) to fully utilize the performance provision to the account (507).

Optionally, each of the submission queues (581, . . . , 583) of the account (507/531) has a corresponding dedicated completion queue. Alternatively, a portion or all of the submission queues (581, . . . , 583) of the account (507/531) may share a completion queue (e.g., 587) (e.g., to reduce the memory usage in the buffer area (580).

The storage device (103) is configured to provide no preference to any of the I/O submission queues (581, . . . , 583, . . . , 585) configured for the storage device (103), such that the data access performance of the storage device (103) is evenly distributed to its I/O submission queues (581, . . . , 583, . . . , 585).

Figure 33:
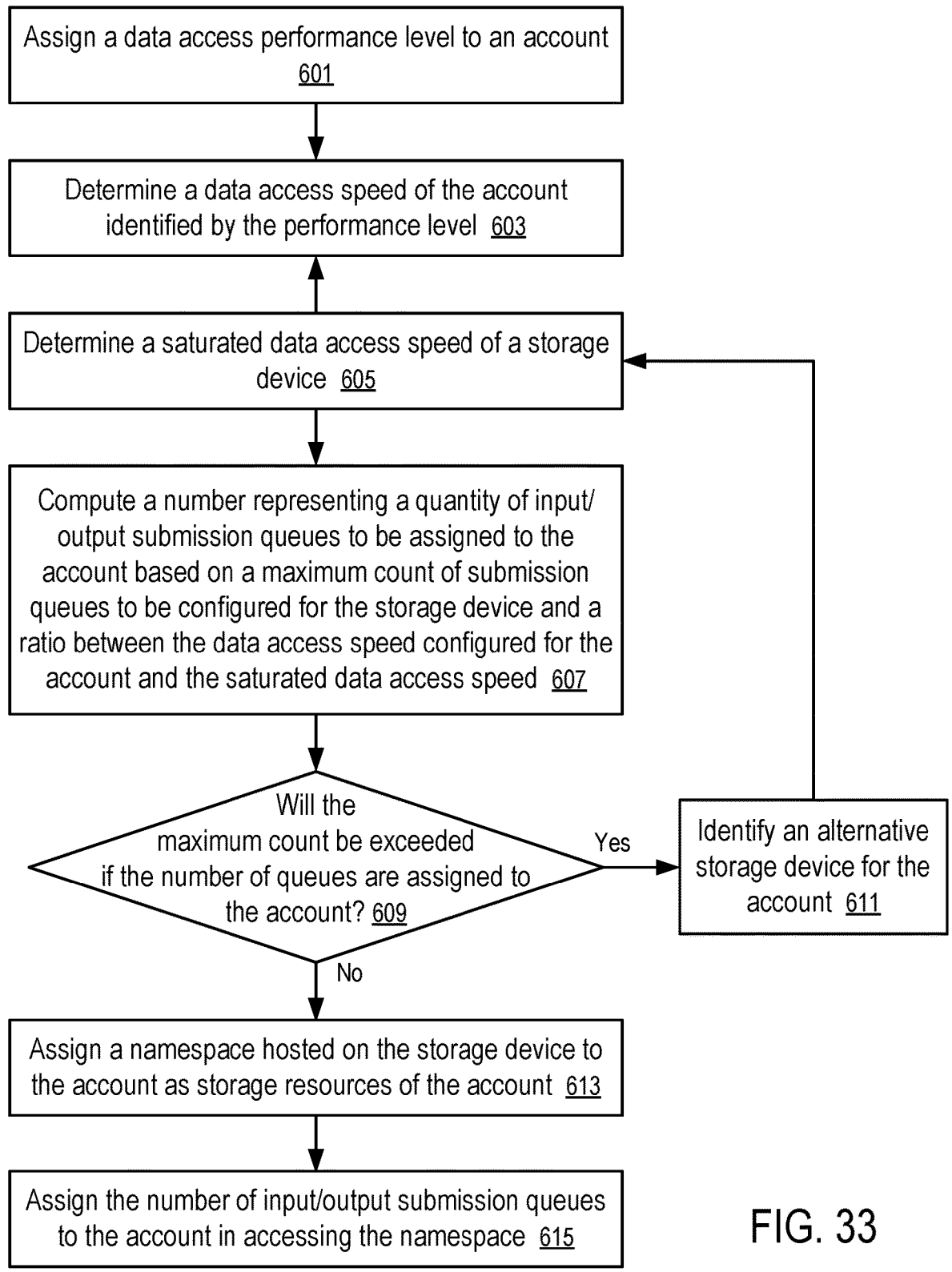
FIG. 33 shows a method to manage data access performance of an account.

FIG. 33 shows a method to manage data access performance of an account. For example, the method of FIG. 33 can be implemented in the system of FIG. 29, with a storage device (103) having a performance characteristic illustrated in FIG. 30, using a data access configuration of FIG. 32 and using the account structure illustrated in FIG. 31.

The method of FIG. 33 includes: assigning (601) a data access performance level (e.g., identified by the performance tier (566)) to an account (507/531); determining (603) a promised data access speed (598) of the account (507/531) identified by the performance level/tier (566); determining (605) a saturated data access speed (593) of a storage device (103); computing (607) a number (599 or 594) representing a quantity of input/output submission queues (e.g., 581, 583, . . . ) to be assigned to the account (507/531) based on a predetermined maximum count/limit (e.g., 595 or 596) of input/output submission queues (e.g., 581, 583, . . . , 585) to be configured for the storage device (103) and based on a ratio between the data access speed (598) that is promised for the account (507/531) and the saturated data access speed (593) achievable in the connection between the host (101) and the storage device (103); and determining (609) whether the maximum count (595 or 596) will be exceeded if the number (599 or 594) of input/output submission queues (e.g., 581, 583, . . . ) are added for assignment to the account (507/531), in addition to the submission queues that have already been assigned to other accounts (e.g., 535) that also use the storage device (103).

If (609) the maximum count (595 or 596) will be exceeded by the addition of submission queues allocated for the account (507/531), the method of FIG. 33 further includes identifying (611) an alternative storage device for the account (507/531); otherwise, the method of FIG. 33 further includes assigning (613) a namespace (522) hosted on the storage device (103) to the account (507/531) as storage resources of the account (507/531) and assigning (615) the number (599 or 594) of input/output submission queues (e.g., 581, 583, . . . ) to the account (507/531) in accessing the namespace (522) by the account (507/531).

For example, an exemplary computer system includes a host (101) having a buffer area (580) and a storage device (103) having a host interface (105), a controller (107), non-volatile storage media (109), and firmware (104). The host (101) configures, in the buffer area (580) and according to a predetermined performance tier (566) of the account (507/531), submission queues (581, 583, . . . ) of data access commands or requests that are from the account (531).

When the performance tier (566) of the account (507/531) requires a promised input/output speed (e.g., 598) in accessing the non-volatile storage media (109) of the storage device (103), the submission queues (581, 583, . . . ) of the account (531) are configured such that the account (531) can access the non-volatile storage media (109) at least at the promised input/output speed (e.g., 598).

For example, the host (101) determines, according to the performance tier (566) of the account (507/531), a quantity (599 or 594) of submission queues (581, 583, . . . ) and allocates, the quantity (599 or 594) of submission queues (581, 583, . . . ) for the exclusive use by the account (531) in the computer system. The host (101) assigns the submission queues (581, 583, . . . ) for exclusive use by the account (531), among a plurality of accounts (531, . . . , 535) in the computer system, to achieve the predetermined performance tier (566) in the accessing of the non-volatile storage media (109) by the account (531).

The host (101) is configured to use no more than a predetermined count (595 or 596) of submission queues (581, 583, . . . , 585) for accessing the non-volatile storage media of the storage device concurrently. Thus, when the storage device (103) already has a set of submission queues (e.g., 585, . . . ) allocated for other accounts (e.g., 535) and the difference between the predetermined count/limit (595 or 596) and the count of already allocated submission queues (e.g., 585) for other accounts (e.g., 535) is insufficient to accommodate the performance need of the account (507/531) identified by its performance tier (566), the storage resource of the account (507/531) is to be allocated on an alternative storage device.

As illustrated in FIG. 30, the hosts may determine the number (e.g. 599 or 594) of the submission queues (581, 583, . . . ) to be assigned for exclusive use by the account (531) based on a fraction of the predetermined count (595 or 596), determined according to a ratio between the performance (598) promised for the account (531) in accessing the storage device (103) and the saturated performance (593) of the storage device (103) starting at the threshold number (595) of submission queues in increasing queues for the storage device (103).

The predetermined count (595 or 596) may be equal to or larger than the threshold number (595) of submission queues.

When the predetermined count (595) used for the calculation of the number (599) of submission queues to be allocated to the account (531) is equal to the threshold number (595), data access performance achievable in the account (531) via the concurrent use of the submission queues (581, 583 . . . ) that are assigned for exclusive use by the account (531) is substantially independent of data access to non-volatile storage media made by accounts (e.g., 535) other than the account (531).

Alternatively, when the predetermined count (596) used for the calculation of the number (594) of submission queues to be allocated to the account (531) is larger than the threshold number (595), data access performance achievable in the account (531) via the concurrent use of the submission queues (581, 583 . . . ) that are assigned for exclusive use by the account (531) improves when the total number of concurrently used submission queues (e.g., 581, 583, . . . , 585) by the storage device (103) is less than the predetermined count (596).

The host (101) is configured to distribute evenly, to the submission queues (581, 583, . . . ) that are assigned for exclusive use by the account, the data access requests/commands generated from the account (531). No data access requests/commands from other accounts (e.g., 585) are placed in the submission queues (581, 583, . . . ) assigned for the account (531).

The controller of the storage device is configured to provide no preference in processing the different submission queues (581, 583, . . . , 585) configured in the buffer area for the storage device (103). Such an arrangement allows the even distribution of the performance (593) of the storage device (103) among the submission queues (581, 583, . . . , 585) and thus the accounts that have storage resources allocated from the storage device (103).

Optionally, the host (101) assigns a namespace (522) for exclusive use by the account (507); and the storage device (103) stores a namespace map (521) that defines a block-by-block mapping between logical addresses defined in the namespace (522) and logical addresses defined in the entire capacity (220) of the storage device (103). The account (507) accesses a portion of the non-volatile storage media (109) via the logical addresses defined in the namespace (522), which is to be translated into local addresses defined on the capacity (220) and then to physical addresses of the portion of the non-volatile storage media assigned to the account (531). Optionally, the storage device (103) has a register storing a crypto key (421) of the namespace (521) during data access performed in the namespace (521).

Optionally, the host (101) creates a completion queue for each of the submission queues (581, 583, . . . ) assigned to the account (531). Alternatively, the host (101) creates a single completion queue for sharing by the entire set of the submission queues (581, 583, . . . ) assigned to the account (531).

A non-transitory computer storage medium can be used to store instructions of the firmware (104). When the instructions are executed by the controller (107) of the computer storage device (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer system, comprising:
a host having a buffer area; and
a storage device having:
  a host interface;
  a controller;
  non-volatile storage media; and
  firmware; and
wherein the host configures, in the buffer area and according to a predetermined performance tier of an account, submission queues of requests from the account to access the non-volatile storage media;
wherein the host assigns the submission queues for exclusive use by the account, to achieve the predetermined performance tier in the account accessing the non-volatile storage media;
wherein the host configures no more than a predetermined count of submission queues for accessing the non-volatile storage media of the storage device concurrently;
wherein the host determines a number of the submission queues to be assigned for exclusive use by the account based on a fraction of the predetermined count determined according to a ratio between: performance provisioned to the account in accessing the storage device; and saturated performance of the storage device at a threshold number of submission queues beyond which data access performance of the storage device become saturated.

2. The computer system of claim 1, wherein the performance tier of the account identifies a predetermined input/output speed in accessing the non-volatile storage media of the storage device; and the submission queues are configured to allow the account to access the non-volatile storage media at least at the predetermined input/output speed.

3. The computer system of claim 1, wherein the host determines, according to the performance tier of the account, a quantity of the submission queues and allocates, the quantity of the submission queues for exclusive use by the account in the computer system.

4. The computer system of claim 1, wherein the predetermined count is the threshold number of submission queues.

5. The computer system of claim 4, wherein data access performance achievable in the account via the submission queues assigned for exclusive use by the account is substantially independent of data access to non-volatile storage media made by accounts other than the account.

6. The computer system of claim 1, wherein the predetermined count is larger than the threshold number of submission queues.

7. The computer system of claim 6, wherein data access performance achievable in the account via the submission queues assigned for exclusive use by the account improves when a total number of concurrently used submission queues by the storage device is less than the predetermined count.

8. The computer system of claim 1, wherein the host distributes evenly, to the submission queues assigned for exclusive use by the account, requests from the account.

9. The computer system of claim 8, wherein the controller of the storage device provides no preference in processing requests in submission queues configured in the buffer area for the storage device.

10. The computer system of claim 9, wherein the host assigns a namespace for exclusive use by the account; and the storage device stores a namespace map that defines a mapping between:
logical addresses defined in the namespace, wherein the account accesses a portion of the non-volatile storage media via the logical addresses in the namespace; and
logical addresses, defined in a capacity of the storage device, corresponding to the portion of the non-volatile storage media assigned to the account.

11. The computer system of claim 10, wherein the firmware includes instructions which when executed by the controller, cause the controller to convert, using the namespace map, the logical addresses defined the namespace to physical addresses of the portion of the non-volatile storage media.

12. The computer system of claim 11, wherein the storage device has a register storing a crypto key of the namespace during data access performed in the namespace.

13. A method implemented in a computer system, the method comprising:
establishing a communication connection between a host and a storage device having:
a host interface;
a controller;
non-volatile storage media; and
firmware;
creating, in a buffer area of a host, a plurality of input/output submission queues of requests to access the non-volatile storage media;
assigning, by the host, according to a predetermined data access performance level of an account, a number of submission queues, among the plurality of input/output submission queues, to the account;
distributing requests from the account for accessing the non-volatile storage media to the number of submission queues assigned to the account, wherein requests from accounts other from the account for accessing the non-volatile storage media are not placed in the number of submission queues assigned to the account;
configuring no more than a predetermined count of submission queues for concurrent use by the storage device; and
computing the number from:
the predetermined count;
a data access speed configured for the account; and
a saturated data access speed of the storage device.

14. The method of claim 13, further comprising; processing by the controller requests from the plurality of input/output submission queues with equal priority.

15. The method of claim 14, further comprising;
creating a completion queue in the buffer area; and
configuring the number of submission queues assigned to the account to share the completion queue.

16. A non-transitory computer storage medium storing instructions which, when executed by a computer system, cause the computer system to perform a method, the method comprising:
establishing a communication connection between a host and a storage device having:
a host interface;
a controller;
non-volatile storage media; and
firmware;
creating, in a buffer area of a host, a plurality of input/output submission queues of requests to access the non-volatile storage media;
assigning, by the host, according to a predetermined data access performance level of an account among a plurality of accounts, a number of submission queues for exclusive use by the account, among the plurality of input/output submission queues;
distributing requests from the account for accessing the non-volatile storage media to the number of submission queues assigned to the account, wherein requests from accounts other from the account for accessing the non-volatile storage media are not placed in the number of submission queues assigned to the account; and
computing the number from:
the predetermined count;
a data access speed configured for the account; and
a saturated data access speed of the storage device.

* * * * *